United States Patent
Nakadai et al.

(10) Patent No.: US 9,247,343 B2
(45) Date of Patent: Jan. 26, 2016

(54) SOUND DIRECTION ESTIMATION DEVICE, SOUND PROCESSING SYSTEM, SOUND DIRECTION ESTIMATION METHOD, AND SOUND DIRECTION ESTIMATION PROGRAM

(71) Applicant: HONDA MOTOR CO., LTD., Tokyo (JP)

(72) Inventors: Kazuhiro Nakadai, Wako (JP); Keisuke Nakamura, Wako (JP); Keita Okutani, Kyoto (JP)

(73) Assignee: HONDA MOTOR CO., LTD., Tokyo (JP)

( * ) Notice: Subject to any disclaimer, the term of this patent is extended or adjusted under 35 U.S.C. 154(b) by 219 days.

(21) Appl. No.: 14/023,600

(22) Filed: Sep. 11, 2013

(65) Prior Publication Data
US 2014/0072142 A1    Mar. 13, 2014

(30) Foreign Application Priority Data

Sep. 13, 2012    (JP) .................................. 2012-201874

(51) Int. Cl.
| | |
|---|---|
| H04R 3/00 | (2006.01) |
| H04R 1/32 | (2006.01) |
| G01S 17/02 | (2006.01) |
| G01S 17/08 | (2006.01) |
| G01S 3/808 | (2006.01) |

(52) U.S. Cl.
CPC ................ *H04R 1/32* (2013.01); *G01S 3/8083* (2013.01); *G01S 17/023* (2013.01); *G01S 17/08* (2013.01)

(58) Field of Classification Search
CPC ............ H04R 1/32; H04R 1/326; H04R 1/40; H04R 1/406
See application file for complete search history.

(56) References Cited

U.S. PATENT DOCUMENTS

2012/0069714 A1 *   3/2012   Nakadai et al. ............... 367/125

FOREIGN PATENT DOCUMENTS

| JP | 2010-281816 A | 12/2010 |
| JP | 2012-042465 A | 3/2012 |

* cited by examiner

*Primary Examiner* — Joseph Saunders, Jr.
(74) *Attorney, Agent, or Firm* — Squire Patton Boggs (US) LLP

(57) ABSTRACT

A sound direction estimation device includes a first correlation matrix calculation unit configured to calculate a correlation matrix of a plurality of channels of input sound signals, a second correlation matrix calculation unit configured to calculate a correlation matrix of noise signals based on the plurality of channels of sound signals, and a sound source localization unit configured to calculate a spatial spectrum based on the correlation matrix calculated by the first correlation matrix calculation unit and the correlation matrix calculated by the second correlation matrix calculation unit and to estimate a direction of a sound source associated with the plurality of channels of sound signals using the calculated spatial spectrum.

8 Claims, 14 Drawing Sheets

FIG. 13
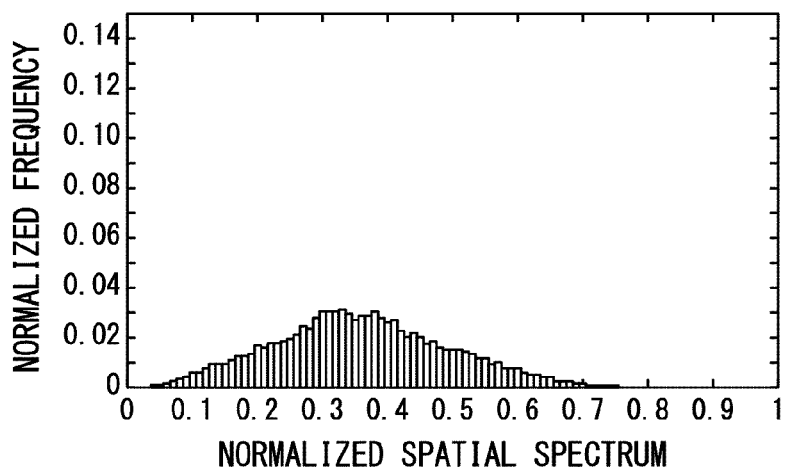
(a)
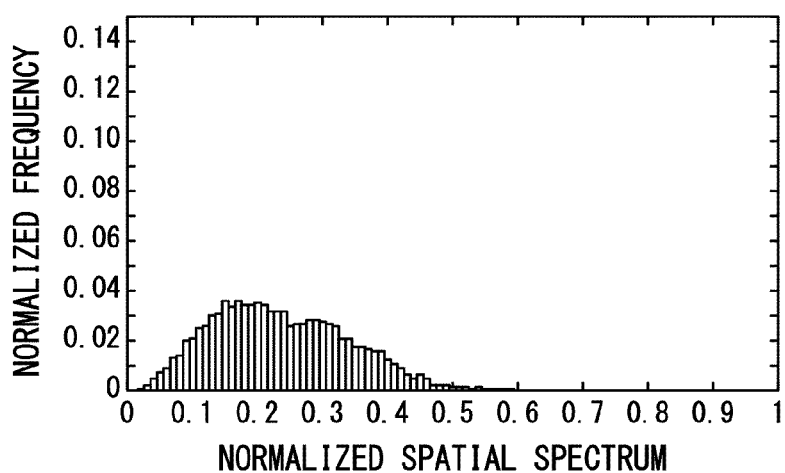
(b)
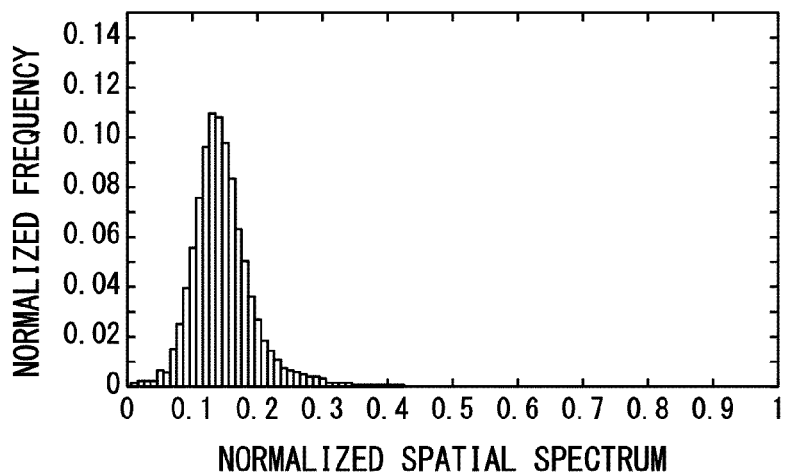
(c)

FIG. 14

| METHOD | STANDARD DEVIATION |
|---|---|
| SEVD-MUSIC | 0.14 |
| GEVD-MUSIC | 0.12 |
| THIS EMBODIMENT | 0.058 |

FIG. 15

| CONDITION | SEVD | | GEVD | | THIS EMBODIMENT | |
|---|---|---|---|---|---|---|
| | LAR | LCR | LAR | LCR | LAR | LCR |
| INDOOR AND FIXED | -100 | 36 | 93 | 93 | 100 | 100 |
| INDOOR AND FLIGHT | -186 | 39 | 42 | 92 | 50 | 92 |
| OUTDOOR AND FIXED | -207 | 29 | -121 | 14 | 14 | 71 |

SOUND DIRECTION ESTIMATION DEVICE, SOUND PROCESSING SYSTEM, SOUND DIRECTION ESTIMATION METHOD, AND SOUND DIRECTION ESTIMATION PROGRAM

CROSS REFERENCE TO RELATED APPLICATIONS

Priority is claimed on Japanese Patent Application No. 2012-201874, filed on Sep. 13, 2012, the contents of which are entirely incorporated herein by reference.

BACKGROUND OF THE INVENTION

1. Field of the Invention

The present invention relates to a sound direction estimation device, a sound processing system, a sound direction estimation method, and a sound direction estimation program.

2. Description of Related Art

In the related art, a sound direction estimating technique of estimating a direction of a sound source from multiple sound signals has been proposed. The sound direction estimating technique is one of means for acquiring information on surrounding environments. The estimated sound direction is used, for example, as a condition for allowing a robot to determine an operation thereof. Accordingly, application of such a technique for work support or remote control in dangerous places and the like has been attempted.

In recorded sound signals, noise such as an operation sound of a piece of equipment such as an air conditioner or wind noise is superimposed on a target sound such as a speech uttered by a person or music. This noise serves as a cause of lowering estimation accuracy of a sound direction of a target sound. Therefore, reduction of an influence of noise on estimation of a sound direction has been proposed.

For example, Japanese Unexamined Patent Application, First Publication No. 2010-281816 (Patent Document 1) discloses a sound direction estimation device that calculates a correlation matrix of input sound signals, calculates eigenvectors using the calculated correlation matrix and a correlation matrix of noise, and estimates a sound direction using the calculated eigenvectors.

Japanese Unexamined Patent Application, First Publication No. 2012-042465 (Patent Document 2) discloses a sound direction estimation device that identifies a type of a sound source based on sound feature values of input sound signals, calculates a correlation matrix of the identified type of sound signals, and estimates a sound direction using calculated eigenvectors. In both the sound direction estimation devices disclosed in Patent Document 1 and Patent Document 2, it is necessary to acquire noise correlation matrixes or sound feature values for each type of sound source in advance.

SUMMARY OF THE INVENTION

However, in actual environments, the level of noise or the frequency characteristics, or the like vary from time to time. That is, in the sound direction estimation device disclosed in Patent Document 1 or Patent Document 2, the influence of noise may not be excluded only by using a limited number of noise correlation matrices or sound feature values for each type of sound source acquired in advance. Accordingly, in the actual environments, it is difficult to accurately estimate a direction of a target sound.

The present invention is made in consideration of the above-mentioned circumstances and an object thereof is to accurately estimate a direction of a target sound.

(1) In order to achieve the above-mentioned object, according to an aspect of the present invention, a sound direction estimation device is provided including: a first correlation matrix calculation unit configured to calculate a correlation matrix of a plurality of channels of input sound signals; a second correlation matrix calculation unit configured to calculate a correlation matrix of noise signals based on the plurality of channels of sound signals; and a sound source localization unit configured to calculate a spatial spectrum based on the correlation matrix calculated by the first correlation matrix calculation unit and the correlation matrix calculated by the second correlation matrix calculation unit and to estimate a direction of a sound source associated with the plurality of channels of sound signals using the calculated spatial spectrum.

(2) According to another aspect of the present invention, in the sound direction estimation device, the noise signals in the second correlation matrix calculation unit may be signals obtained by delaying the plurality of channels of sound signals and a delay time may be longer than a time of the plurality of channels of sound signals used to calculate the correlation matrix by the first correlation matrix calculation unit.

(3) According to another aspect of the present invention, in the sound direction estimation device, a time of noise signals used to calculate the correlation matrix by the second correlation matrix calculation unit may be longer than a time of the plurality of channels of sound signals used to calculate the correlation matrix by the first correlation matrix calculation unit.

(4) According to another aspect of the present invention, in the sound direction estimation device, the sound direction estimation device may further include a noise estimation unit configured to generate a target sound signal including a predetermined type of target sound and a noise signal indicating a noise component, which is a component different from the target sound, from the plurality of channels of input sound signals, the first correlation matrix calculation unit may be configured to calculate the correlation matrix using the target sound signal generated by the noise estimation unit as the plurality of channels of input sound signals, and the second correlation matrix calculation unit may be configured to calculate the correlation matrix using the noise signal generated by the noise estimation unit as the noise signals.

(5) According to another aspect of the present invention, the sound direction estimation device may further include an eigenvector calculation unit configured to calculate an eigenvector by applying generalized eigenvalue decomposition (GEVD) to a matrix obtained by multiplying the correlation matrix calculated by the first correlation matrix calculation unit by an inverse matrix of the correlation matrix calculated by the second correlation matrix calculation unit, and the sound source localization unit may calculate the spatial spectrum by dividing a norm of a transfer function vector for each direction of sound sources by a sum of inner products of a predetermined number of eigenvectors out of the eigenvectors calculated by the eigenvector calculation unit and the transfer function vectors.

(6) According to another aspect of the present invention, in the sound direction estimation device, the sound source localization unit may estimate a direction in which an average spatial spectrum which is an average of frequencies of the spatial spectrums has the local maximum value as the direction of the sound source associated with the plurality of channels of sound signals.

(7) According to still another aspect of the present invention, a sound processing system is provided including: a sound collection unit configured to record a plurality of channels of sound signals; a position estimation unit configured to estimate a position of the sound collection unit; and a sound direction estimation unit configured to estimate a direction of a sound source associated with the plurality of channels of sound signals recorded by the sound collection unit, wherein the sound direction estimation unit includes a first correlation matrix calculation unit configured to calculate a correlation matrix of a plurality of channels of input sound signals, a second correlation matrix calculation unit configured to calculate a correlation matrix of noise signals based on the plurality of channels of sound signals, and a sound source localization unit configured to calculate a spatial spectrum based on the correlation matrix calculated by the first correlation matrix calculation unit and the correlation matrix calculated by the second correlation matrix calculation unit and to estimate a direction of a sound source associated with the plurality of channels of sound signals using the calculated spatial spectrum.

(8) According to still another aspect of the present invention, a sound direction estimation method in a sound direction estimation device is provided including: a first correlation matrix calculating step of calculating a correlation matrix of a plurality of channels of input sound signals; a second correlation matrix calculating step of calculating a correlation matrix of noise signals based on the plurality of channels of sound signals; and a sound source localizing step of calculating a spatial spectrum based on the correlation matrix calculated in the first correlation matrix calculating step and the correlation matrix calculated in the second correlation matrix calculating step and estimating a direction of a sound source associated with the plurality of channels of sound signals using the calculated spatial spectrum.

(9) According to still another aspect of the present invention, a sound direction estimation program is provided causing a computer of a sound direction estimation device to perform: a first correlation matrix calculating procedure of calculating a correlation matrix of a plurality of channels of input sound signals; a second correlation matrix calculating procedure of calculating a correlation matrix of noise signals based on the plurality of channels of sound signals; and a sound source localizing procedure of calculating a spatial spectrum based on the correlation matrix calculated in the first correlation matrix calculating step and the correlation matrix calculated in the second correlation matrix calculating step and estimating a direction of a sound source associated with the plurality of channels of sound signals using the calculated spatial spectrum.

According to Aspects (1), (7), (8), and (9) of the present invention, since a spatial spectrum calculated based on a correlation matrix of input sound signals and a correlation matrix of sequentially-acquired noise signals is used, it is possible to further accurately estimate a direction of a target sound.

According to Aspect (2) of the present invention, the time zone (section) in which the first correlation matrix calculation unit calculates the correlation matrix of the sound signal is different from the time zone (section) of a noise signal in which the second correlation matrix calculation unit calculates the correlation matrix of the noise signal. Accordingly, independency of the correlation matrix calculated by the first correlation matrix calculation unit and the correlation matrix calculated by the second correlation matrix calculation unit from each other is guaranteed. Accordingly, it is possible to further accurately estimate a direction of a target sound.

According to Aspect (3) of the present invention, since it is possible to follow a target sound in which the variation in characteristics is marked more than the noise signal, it is possible to adapt to a variation in direction of a target sound.

According to Aspect (4) of the present invention, since the first correlation matrix calculation unit calculates the correlation matrix based on the target sound signal and the second correlation matrix calculation unit calculates the correlation matrix based on the noise signals indicating a noise component which is a component other than the target sound, it is possible to improve the degree of freedom in section of the signals for calculating the correlation matrices.

Accordingly, it is possible to further reduce a delay in processes.

According to Aspect (5) of the present invention, the matrix obtained by multiplying the correlation matrix calculated by the first correlation matrix calculation unit by the inverse matrix of the correlation matrix calculated by the second correlation matrix calculation unit is a matrix in which contribution of the noise component is removed from the correlation matrix associated with the input sound signals. Since the influence of the noise component is removed from the spatial spectrum calculated based on the eigenvectors calculated from this correlation matrix, it is possible to accurately estimate a direction of a sound source as a target sound.

According to Aspect (6) of the present invention, since the spatial spectrums are averaged in frequency, it is possible to estimate a direction of a sound source representing the overall frequencies.

BRIEF DESCRIPTION OF THE DRAWINGS

FIG. 13 is a diagram illustrating an example of a histogram of a normalized spatial spectrum.

FIG. 14 is a table illustrating a standard deviation of a normalized frequency.

FIG. 15 is a table illustrating an example of a localization accuracy rate and a localization correct rate.

DETAILED DESCRIPTION OF THE INVENTION

First Embodiment

Hereinafter, a first embodiment of the present invention will be described with reference to the accompanying drawings.

Figure 1:
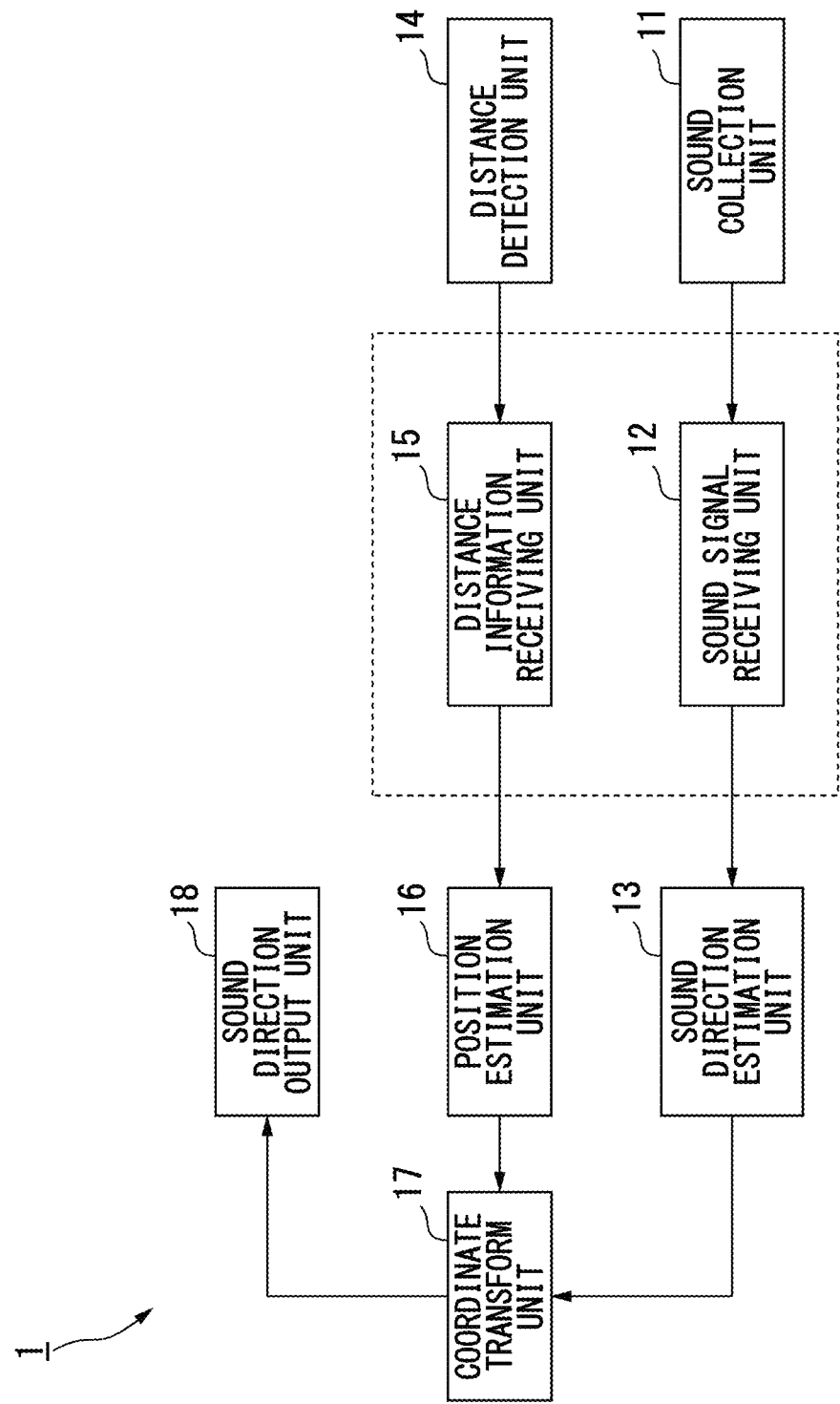
FIG. 1 is a diagram schematically illustrating a configuration of a sound processing system according to a first embodiment of the present invention.

FIG. 1 is a diagram schematically illustrating a configuration of a sound processing system 1 according to this embodiment.

The sound processing system 1 includes a sound collection unit 11, a sound signal receiving unit 12, a sound direction estimation unit 13, a distance detection unit 14, a distance information receiving unit 15, a position estimation unit 16, a coordinate transform unit 17, and a sound direction output unit 18. The sound signal receiving unit 12 and the distance information receiving unit 15 may be constructed as a unified body or may be constructed as individual bodies.

The sound collection unit 11 records multiple channels (M channels where M is an integer larger than 1) of sound signals and transmits the recorded M channels of sound signals to the sound signal receiving unit 12. The sound collection unit 11 includes M sound receivers. The sound collection unit 11 may transmit the recorded M channels of sound signals in a wireless manner or in a wired manner, as long as it can transmit the recorded M channels of sound signals in synchronization between the channels. The sound collection unit 11 may be fixed in position or may be disposed in a moving object such as a vehicle, an aircraft, and a robot so as to be movable. An example of the configuration of the sound collection unit 11 will be described later.

The sound signal receiving unit 12 receives the M channels of sound signals from the sound collection unit 11 and outputs the received M channels of sound signals to the sound direction estimation unit 13.

The sound direction estimation unit 13 estimates a direction of a sound source based on the M channels of sound signals input from the sound signal receiving unit 12 and outputs sound direction information indicating the estimated direction of a sound source to the coordinate transform unit 17. Here, the sound direction estimation unit 13 calculates a correlation matrix $R(\omega, f)$ of the M channels of input sound signals and a noise correlation matrix $K(\omega, f)$ of noise signals based on the M channels of sound signals for each frequency $\omega$ and each frame time f. The sound direction estimation unit 13 calculates a spatial spectrum $P(\omega, f)$ based on the calculated correlation matrix $R(\omega, f)$ and the calculated noise correlation matrix $K(\omega, f)$ and estimates a direction of a sound source $\phi$ using the calculated spatial spectrum $P(\omega, f)$.

In this embodiment, the sound direction estimation unit 13 may be constructed as a sound direction estimation device independent of the other constituent units such as the sound collection unit 11 or may be constructed as a sound direction estimation device unified with at least part of the other constituent units. The configuration of the sound direction estimation unit 13 will be described later.

The distance detection unit 14 detects a distance (depth) from the distance detection unit 14 to each of at least three points in the sound collection unit 11 and transmits distance information indicating the detected distance to each point to the distance information receiving unit 15. The distance detection unit 14 includes, for example, an infrared sensor. In this case, the distance detection unit 14 emits infrared rays as a detection signal used to detect the distance and receives reflected waves reflected from points of the sound collection unit 11. The distance detection unit 14 detects a delay or a phase difference between the emitted detection signal and the received reflected waves. The distance detection unit 14 calculates the distance to each point of the sound collection unit 11 based on the detected delay or phase difference and the light speed.

The distance detection unit 14 may include another detection means such as a laser range finder (LRF) instead of the infrared sensor, as long as it can detect the distance to the sound collection unit 11.

The position of the distance detection unit 14 may be fixed. The distance detection unit 14 may transmit distance information in a wireless manner or in a wired manner, as long as it can transmit the distance information to the distance information receiving unit 15.

The distance information receiving unit 15 receives the distance information from the distance detection unit 14. The distance information receiving unit 15 may receive the distance information in synchronization with the receiving of the sound signals in the sound signal receiving unit 12. The distance information receiving unit 15 may be, for example, an input interface unit constructed as a unified body with the sound signal receiving unit 12. The distance information receiving unit 15 may use a ROS (Robot Operating System) protocol to receive the distance information and the sound signals. The ROS is one of fundamental programs used to manage and control hardware resources constituting a robot.

The distance information receiving unit 15 outputs the distance information received from the distance detection unit 14 to the position estimation unit 16.

The position estimation unit 16 estimates the position of the sound collection unit 11 based on the distances to the points of the sound collection unit 11 indicated by the distance information input from the distance information receiving unit 15. Here, arrangement information on the arrangement of the points of the sound collection unit 11 is set in advance in the position estimation unit 16. The arrangement information is, for example, information indicating coordinates with respect to one point in the sound collection unit 11 and coordinates of multiple reflectors (to be described later) of the sound collection unit 11. The position estimation unit 16 calculates the positions of the points of the sound collection unit 11 with respect to the position of the distance detection unit 14 based on the distances to the points of the sound collection unit 11 from the position estimation unit 16 and the arrangement information. The position estimation unit 16 calculates the position of a point selected out of the calculated positions of the points or the average value of the positions of the points as the position (representative position) of the sound collection unit 11. The position estimation unit 16 calculates a direction of the sound collection unit 11 based on the calculated positions of the points and the calculated representative position of the sound collection unit 11. The direction of the sound collection unit 11 means a direction of a segment connecting two predetermined points of the sound collection unit 11. For example, the direction of the sound collection unit may be a direction of a segment connecting two out of the points indicating the positions of the sound collection unit 11. The position estimation unit 16 outputs position information indicating the calculated position and the calculated direction of the sound collection unit 11 to the coordinate transform unit 17.

The coordinate transform unit 17 transforms sound directions of sound sources indicated by the sound direction information input from the sound direction estimation unit 13 to directions expressed in a coordinate system based on the position of the distance detection unit 14 based on the position information input from the position estimation unit 16. This is because the input sound direction information is expressed in a coordinate system (relative coordinate system) based on the sound collection unit 11. An example of the coordinate transform will be described later with reference to FIG. 5. The coordinate transform unit 17 outputs the sound direction information indicating the transformed directions of the sound sources to the sound direction output unit 18.

The coordinate transform unit 17 may determine whether to transform the directions of the sound sources based on setting information received from the outside through the use of a manipulation input or the like. When the directions of the sound sources are not transformed so as to be based on the position of the distance detection unit 14, the coordinate transform unit 17 outputs the sound direction information input from the sound direction estimation unit 13 to the sound direction output unit 18 without any change thereof.

The sound direction output unit 18 outputs the sound direction information input from the coordinate transform unit 17. The sound direction output unit 18 may be a memory access unit configured to store the input sound direction information in a storage medium or may be an output interface unit configured to output the sound direction information to another device. The sound direction output unit 18 may be a display unit configured to display the directions of the sound sources indicated by the input sound direction information so that a user can see the directions of the sound sources. The sound direction output unit 18 may display a waveform or a spectrogram of sound source signals of the sound sources estimated by the sound direction estimation unit 13 and the directions of the sound sources in correlation with each other.

When the directions of the sound sources are not transformed to be based on the position of the distance detection unit 14, the sound processing system 1 may not include the distance detection unit 14, the distance information receiving unit 15, the position estimation unit 16, and the coordinate transform unit 17. In this case, the sound direction information is input to the sound direction output unit 18 from the sound direction estimation unit 13.

Configuration of Sound Direction Estimation Unit

The configuration of the sound direction estimation unit 13 according to this embodiment will be described below.

Figure 2:
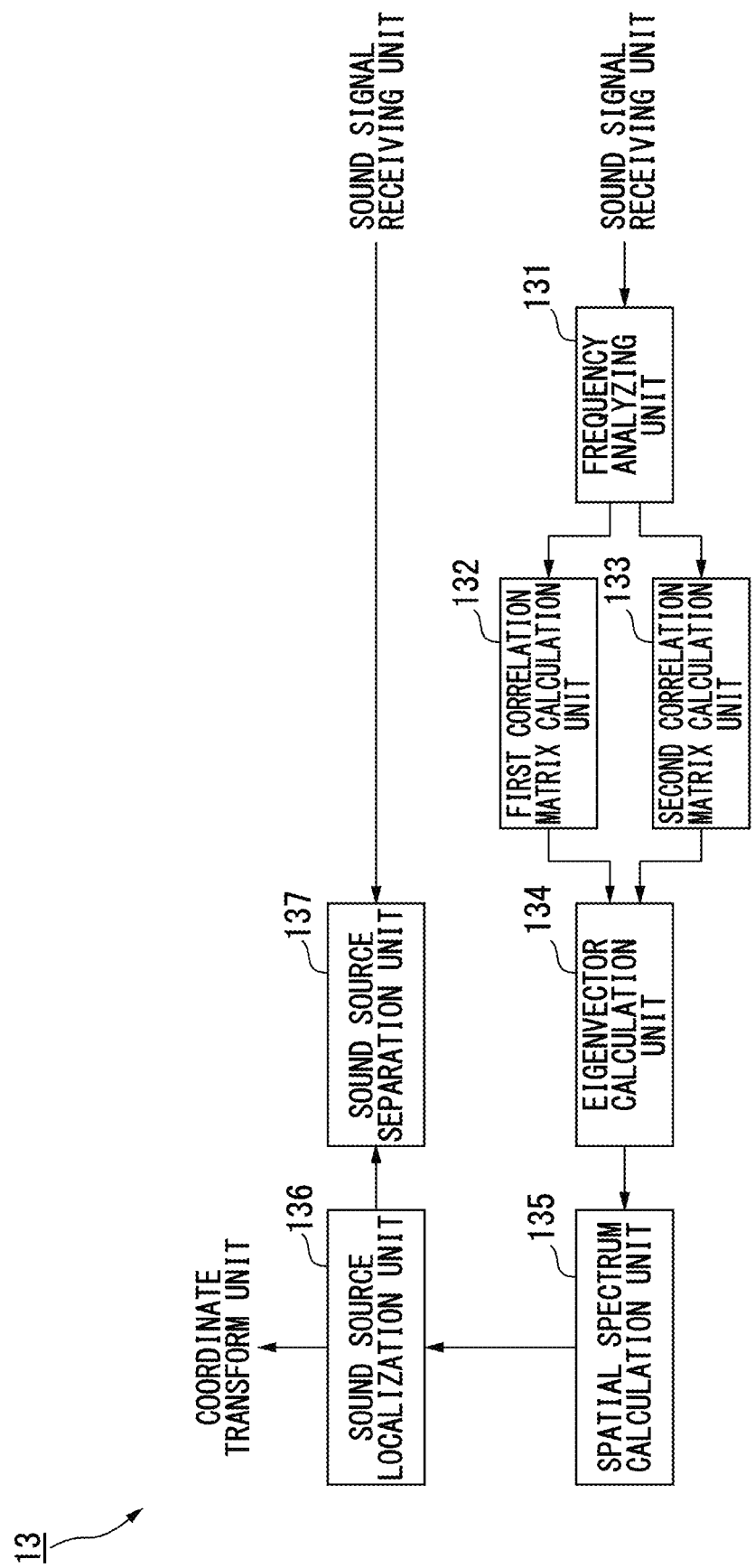
FIG. 2 is a diagram schematically illustrating a configuration of a sound direction estimation unit according to the first embodiment.

FIG. 2 is a diagram schematically illustrating the configuration of the sound direction estimation unit 13 according to this embodiment.

The sound direction estimation unit 13 includes a frequency analyzing unit 131, a first correlation matrix calculation unit 132, a second correlation matrix calculation unit 133, an eigenvector calculation unit 134, a spatial spectrum calculation unit 135, a sound source localization unit 136, and a sound source separation unit 137.

M channels of sound signals are input to the frequency analyzing unit 131 from the sound signal receiving unit 12. The frequency analyzing unit 131 performs a discrete Fourier transform (DFT) on each channel of sound signal for each frame to generate an input signal in the frequency domain. The frame means a time interval of a predetermined length (frame length) or a signal included in the time interval. The frame length is, for example, 10 ms. The frame time is a time (for example, a start time) representing each frame. The frequency analyzing unit 131 outputs the channels of input signals generated for each frame to the first correlation matrix calculation unit 132 and the second correlation matrix calculation unit 133.

The first correlation matrix calculation unit 132 calculates a correlation matrix $R(\omega, f)$ for each frequency $\omega$ and each frame time $f$ using the input signals input from the frequency analyzing unit 131. The correlation matrix $R(\omega, f)$ is a matrix having an inter-channel correlation between an input signal of channel k (where k is an integer of 1 to M) and an input signal of channel l (where l is an integer of 1 to M) as an element value of the k-th row and the l-th column). Accordingly, the correlation matrix $R(\omega, \tau)$ is a square matrix of M rows and M columns.

The first correlation matrix calculation unit 132 calculates the correlation matrix $R(\omega, f)$, for example, using Expression (1).

$$R(\omega, f) = \frac{1}{T_R} \sum_{\tau=f-T_R}^{f} X(\omega, \tau) X^*(\omega, \tau) \quad (1)$$

In Expression (1), f represents the current frame time and $T_R$ represents the length of a section (number of frames) used to calculate the correlation matrix $R(\omega, \tau)$. The length of this section is referred to as a window length. Here, T represents the frame time (not limited to the current frame time). $X(\omega, \tau)$ represents an input signal vector of M columns having input signals in the frequency domain of the channels as elements. * represents a complex conjugate transposition operator of a vector or a matrix. That is, Expression (1) represents that a value obtained by averaging the products of an input signal value of channel k and a complex conjugate of an input signal value of channel l over the section of the window length $T_R$ up to the current frame time f is calculated as the inter-channel correlation.

The first correlation matrix calculation unit 132 outputs the calculated correlation matrix $R(\omega, f)$ to the eigenvector calculation unit 134.

The second correlation matrix calculation unit 133 calculates the noise correlation matrix $K(\omega, f)$ for each frequency $\omega$ and each frame time f using noise signals based on the input signals input from the frequency analyzing unit 131. The noise correlation matrix $K(\omega, f)$ is a matrix having the inter-channel correlation between a noise signal of channel k and a noise signal of channel l as an element value of the k-th row and the l-th column. The noise signal is a signal indicating a noise component associated with the current input signal. The second correlation matrix calculation unit 133 uses a signal, which is obtained by delaying an input signal, for example, by a delay time $f_s$, as the noise signal. Accordingly, the noise correlation matrix $K(\omega, f)$ is a square matrix of M rows and M columns.

The second correlation matrix calculation unit 133 calculates the noise correlation matrix $K(\omega, f)$, for example, using Expression (2).

$$K(\omega, f) = \frac{1}{T_N} \sum_{\tau=f-F_s-T_N}^{f-f_s} X(\omega, \tau) X^*(\omega, \tau) \quad (2)$$

In Expression (2), $T_N$ represents the window length used to calculate the noise correlation matrix $K(\omega, \tau)$. That is, Expression (2) represents that a value obtained by averaging the products of an input signal value of channel k and a complex conjugate of an input signal value of channel l over the section of the window length $T_N$ from the frame time f-$f_s$-$T_N$ to the frame time f-$f_s$ is calculated as the inter-channel correlation between channel k and channel l.

In this example, the reason of estimating the signal simply delayed by the delay time $f_s$ as the noise signal is that since the frequency characteristics of an input signal always vary, a target sound component in the current input signal is likely to be different from the previous input signal. Here, as the delay time $f_s$ becomes larger, the noise correlation matrix K($\omega$, f) is more independent of the correlation matrix R($\omega$, $\tau$). On the contrary, as the delay time $f_s$ becomes smaller, the situation of noise at the time of calculating the correlation matrix R($\omega$, $\tau$) is more reflected in the noise correlation matrix K($\omega$, f). In this example, the delay time $f_s$ is a value larger than zero. This is because when the delay time $f_s$ is zero, the correlation matrix R($\omega$, $\tau$) and the noise correlation matrix K($\omega$, f) are equal to each other and thus the direction of a target sound cannot be estimated.

Regarding the window length $T_N$, as the window length $T_N$ becomes larger, the temporal variation of the noise correlation matrix K($\omega$, $\tau$) becomes slower and thus the processing result becomes more stabilized. On the contrary, as the window length $T_N$ becomes smaller, it is possible to follow the temporal variation in frequency characteristics of the input signal better. In this way, the delay time $f_s$ and the window length $T_N$ have a trade-off relationship. Appropriate values are set in advance as the delay time $f_s$ and the window length $T_N$ in the second correlation matrix calculation unit 133. Examples of the delay time $f_s$ and the window length $T_N$ will be described later.

Here, the delay time $f_s$ may be determined to be a value larger than the window length $T_R$ associated with the correlation matrix R($\omega$, f). Accordingly, it is possible to avoid overlapping of the section in which the correlation matrix R($\omega$, f) is calculated and the section in which the noise correlation matrix K($\omega$, f) is calculated. Particularly, under stationary noise in which the variation in frequency characteristics of noise is small, independency of the noise correlation matrix K($\omega$, f) associated with noise and the correlation matrix R($\omega$, f) associated with a target sound from each other can be guaranteed. That is, it is possible to reduce degradation of estimation accuracy of a sound direction due to noise.

The window length $T_N$ associated with the noise correlation matrix K($\omega$, f) may be determined to be a value larger than the window length $T_R$ associated with the correlation matrix R($\omega$, f). Particularly, under the stationary noise, since the temporal variation of the noise correlation matrix K($\omega$, f) is not sufficient, it is allowed to elongate the window length $T_N$. On the contrary, since the temporal variation of the input signal mainly has the temporal variation of a target sound component, it is preferable that the window length $T_N$ is shortened to follow the temporal variation in calculating the correlation matrix R($\omega$, f).

The second correlation matrix calculation unit 133 outputs the calculated noise correlation matrix K($\omega$, f) to the eigenvector calculation unit 134.

The eigenvector calculation unit 134 calculates an eigenvector for each frequency $\omega$ and each frame time f using the correlation matrix R($\omega$, f) input from the first correlation matrix calculation unit 132 and the noise correlation matrix K($\omega$, f) input from the second correlation matrix calculation unit 133. Here, the eigenvector calculation unit 134 performs generalized eigenvalue decomposition (GEVD) on a matrix K($\omega$, f)$^{-1}$R($\omega$, f) obtained by multiplying the correlation matrix R($\omega$, f) by the inverse matrix K($\omega$, f)$^{-1}$ of the noise correlation matrix K($\omega$, f) from the left side. The eigenvector calculation unit 134 calculates a regular matrix E($\omega$, f) and an eigenvalue matrix $\Lambda$($\omega$, f) satisfying the relationship of Expression (3) through the GEVD.

$$K(\omega,f)^{-1}R(\omega,f)=E(\omega,f)\Lambda(\omega,f)E^*(\omega,f) \quad (3)$$

In Expression (3), the eigenvalue matrix $\Lambda$($\omega$, f) is a matrix having M eigenvalues $\lambda_1, \ldots, \lambda_M$ as diagonal elements. The order 1, ..., M of the eigenvalues $\lambda_1, \ldots, \lambda_M$ is a descending order in magnitude. The regular matrix E($\omega$, f) is a matrix in which eigenvectors $e_1, \ldots, e_M$ are arranged in the column direction in the descending order of eigenvalues $\lambda_1, \ldots, \lambda_M$. The eigenvectors $e_1, \ldots, e_M$ are eigenvectors corresponding to the eigenvalues $\lambda_1, \ldots, \lambda_M$. Specifically, the eigenvector calculation unit 134 calculates the eigenvectors $e_1, \ldots, e_M$ so as to satisfy the relationship of Expression (4) along with the eigenvalues $\lambda_1, \ldots, \lambda_M$.

$$R(\omega,f)e_m(\omega,f)=\lambda_m K(\omega,f)e_m(\omega,f) \quad (4)$$

In Expression (4), m is an integer of 1 to M.

Accordingly, the correlation matrix R($\omega$, f) is whitened with the noise correlation matrix K($\omega$, f). That is, the eigenvectors $e_1, \ldots, e_M$ are calculated after the influence of noise is removed. The eigenvectors $e_1, \ldots, e_M$ may be normalized so that the absolute value is 1.

The eigenvector calculation unit 134 outputs the calculated M eigenvectors $e_1, \ldots, e_M$ to the spatial spectrum calculation unit 135.

M eigenvectors $e_1, \ldots, e_M$ are input to the spatial spectrum calculation unit 135 from the eigenvector calculation unit 134. The spatial spectrum calculation unit 135 includes a storage unit (not shown) in which a transfer function vector G($\omega$, $\phi$) is stored in advance for each frequency $\omega$ and each sound direction $\phi$. The transfer function vector G($\omega$, $\phi$) is a vector of M columns having transfer functions from the sound direction $\phi$ to the microphones (channels) of the sound collection unit 11 as element values. The transfer function vector G($\omega$, $\phi$) is also referred to as a steering vector.

The spatial spectrum calculation unit 135 reads the transfer function vector G($\omega$, $\phi$) of the sound direction $\phi$ included in a predetermined search range from the storage unit. The search range means a range in which a candidate of the sound direction $\phi$ is searched for.

The spatial spectrum calculation unit 135 calculates a spatial spectrum P($\omega$, $\phi$, f) of each frame f for each frequency $\omega$ and each sound direction $\phi$ based on the M eigenvectors $e_1, \ldots, e_M$ and the read transfer function vector G($\omega$, $\phi$). The spatial spectrum calculation unit 135 uses, for example, Expression (5) to calculate the spatial spectrum P($\omega$, $\phi$, f).

$$P(\omega, \psi, f) = \frac{|G^*(\omega, \psi)G(\omega, \psi)|}{\sum_{m=L+1}^{M} |G^*(\omega, \psi)e_m(\omega, f)|} \quad (5)$$

In Expression (5), | ... | represents the absolute value and L represents the number of target sound sources. The number of target sound sources is the maximum value of the number of sound sources of which the sound direction is detected as a target sound. L is a predetermined integer greater than 0 and smaller than M. That is, the spatial spectrum P($\omega$, $\phi$, f) is calculated by dividing the norm of the transfer function vector G($\omega$, $\phi$) by the total sum of the inner products of the transfer function vector G($\omega$, $\phi$) and the M-L eigenvectors $e_{L+1}, \ldots, e_M$. Ideally, the directions of the M-L eigenvectors $e_{L+1}, \ldots, e_M$ are perpendicular to the transfer function vector G($\omega$, $\phi$) associated with the L sound directions $\phi$. Accordingly, the spatial spectrum P($\omega$, $\phi$, f) associated with the sound direction $\phi$ has a value larger than those in the other directions.

The spatial spectrum calculation unit 135 averages the calculated spatial spectrums P(ω, φ, f) over a predetermined frequency band and calculates an average spatial spectrum <P(φ, f)> for each frame f and each sound direction φ. The spatial spectrum calculation unit 135 uses, for example, Expression (6) to calculate the average spatial spectrum <P(φ, f)>.

$$\langle P(\psi, f)\rangle = \frac{1}{\omega_H - \omega_L + 1} \sum_{\omega=\omega_L}^{\omega_H} P(\omega, \psi, f) \quad (6)$$

In Expression (6), $\omega_H$ represents an index of the upper limit of a frequency (upper limit frequency) in the frequency band and $\omega_L$ represents an index of the lower limit of a frequency (lower limit frequency) in the frequency band. The upper limit frequency is, for example, 3.5 kHz and the lower limit frequency is, for example, 0.5 kHz. The denominator $\omega_H - \omega_L + 1$ of the right side of Expression (6) represents the number of spatial spectrums P(ω, φ, f) to be added (Σ). The reason of adding 1 to the denominator is that the frequencies ω are discrete and the spatial spectrum $P(\omega_H, \phi, f)$ associated with the upper limit frequency and the spatial spectrum $P(\omega_L, \phi, f)$ of the lower limit frequency which are both ends of the frequency band are to be added.

The spatial spectrum calculation unit 135 outputs the calculated average spatial spectrum <P(φ, f)> to the sound source localization unit 136.

The sound source localization unit 136 determines the sound direction φ for each frame f based on the average spatial spectrum <P(φ, f)> input from the spatial spectrum calculation unit 135. Here, the sound source localization unit 136 selects L sound directions φ as a maximum value which are sound directions φ in which the average spatial spectrum <P(φ, f)> is larger than a predetermined threshold value and the average spatial spectrum <P(φ, f)> has a local maximum value. When the number of local maximum values detected is larger than L, the sound source localization unit 136 selects L sound directions φ out of the detected sound directions φ. Here, the sound source localization unit 136 selects from the sound direction φ in which the average spatial spectrum <P(φ, f)> is the largest to the sound direction φ in which the average spatial spectrum <P(φ, f)> is the L-th largest.

The sound source localization unit 136 outputs sound direction information indicating the selected sound directions φ of the sound sources to the coordinate transform unit 17 and the sound source separation unit 137.

The sound source separation unit 137 separates the sound signals of the sound sources from the M channels of sound signals input from the sound signal receiving unit 12 based on the input sound direction information. Here, the sound source separation unit 137 calculates a spatial filter coefficient in which the directivity to the sound direction φ for each sound source indicated by the sound direction information is the highest for each channel, for example, based on the arrangement of the microphones corresponding to the channels in the sound collection unit 11. The sound source separation unit 137 performs a convolution of the calculated spatial filter coefficients on the M channels of sound signals and generates the sound signal of the sound source. The sound source separation unit 137 is not limited to the above-mentioned method, as long as it is a method capable of generating a sound signal of a sound source based on the sound directions and the arrangement of the microphones of the channels.

The sound source separation unit 137 outputs the generated sound signal to the outside. The sound source separation unit 137 may output the generated sound signal to the sound direction output unit 18.

The process of calculating the sound direction φ with the above-mentioned configuration is also referred to as an iGEVD (incremental Generalized Eigenvalue Decomposition based)-MUSIC (Multiple Signal Classification) method in the following description. Processes using a noise correlation matrix K having a predetermined constant value and a unit matrix I instead of the noise correlation matrix K(ω, f) are also referred to as a GEVD-MUSIC method and an SEVD Standard Eigenvalue Decomposition based)-MUSIC method, respectively.

Relationship between Window Lengths $T_R$ and $T_N$ and Delay Time $f_s$

The relationship between the window lengths $T_R$ and $T_N$ and the delay time $f_s$ will be described below.

Figure 3:
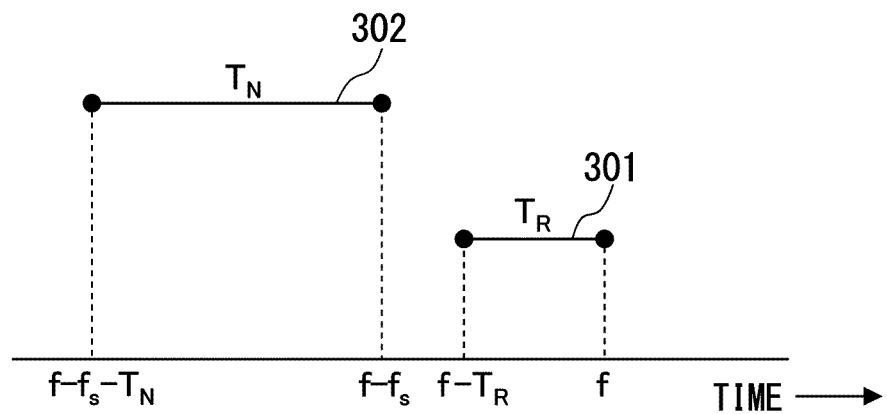
FIG. 3 is a conceptual diagram illustrating an example of a window length and a delay time in the first embodiment.

FIG. 3 is a conceptual diagram illustrating an example of the window length and the delay time in this embodiment.

In FIG. 3, the horizontal axis represents time. Segment 301 represents the window length $T_R$ associated with a correlation matrix R(ω, f). The frame time indicated by the start point of segment 301 is $f - T_R$ and the frame time indicated by the end point thereof is f. That is, segment 301 represents that a correlation matrix R(ω, f) is calculated on the N channels of sound signals in the section between the start point and the end point.

Segment 302 represents the window length $T_N$ associated with a noise correlation matrix K(ω, f). The frame time of the start point of segment 302 is $f - f_s - T_N$ and the frame time of the end point thereof is $f - f_s$. That is, segment 302 represents that a noise correlation matrix K(ω, f) is calculated on the N channels of sound signals in the section between the start point and the end point.

FIG. 3 shows that the overlap of the section (between $f - T_R$ and f) in which the correlation matrix R(ω, f) is calculated and the section (between $f - f_s - T_N$ and $f - f_s$) in which the noise correlation matrix K(ω, f) is calculated is avoided by setting the delay time $f_s$ from the current frame time f to be larger than the window length $T_R$. Accordingly, the independence of the correlation matrix R(ω, f) and the noise correlation matrix K(ω, f) can be guaranteed.

In the example shown in FIG. 3, the window length $T_N$ is larger than the window length $T_R$. When the variation in frequency characteristics of noise is slower than that of a target sound such as a speech, it is possible to calculate a stable noise correlation matrix K(ω, f) by setting the window length in this way and it is possible to determine a correlation matrix R(ω, f) to be follow the temporal variation better.

Configuration Example of Sound Collection Unit

A configuration example of the sound collection unit 11 will be described below.

Figure 4:
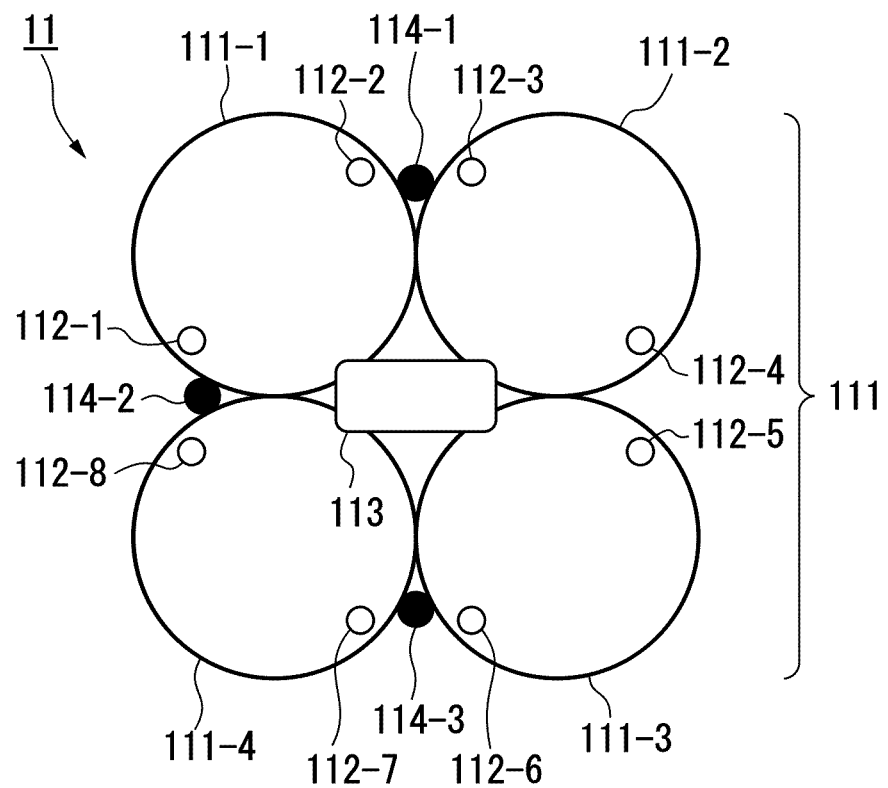
FIG. 4 is a conceptual diagram illustrating a configuration example of a sound collection unit in the first embodiment.

FIG. 4 is a conceptual diagram illustrating a configuration example of the sound collection unit 11 in this embodiment.

The sound collection unit 11 includes a moving object 111, eight microphones 112-1 to 112-8, a signal processing unit 113, and three reflectors (markers) 114-1 to 114-3.

The moving object 111 is, for example, a quadrocopter having four rotors. The quadrocopter is also called a quadrotor.

The moving object 111 includes four wheel-like supports 111-1 to 111-4. The central points of the supports 111-1 to 111-4 are arranged at vertices of a square in the same horizontal plane. Each of the supports 111-1 to 111-4 includes a rotor (not shown) having a rotational axis at the center thereof. The moving object 111 flies by causing the rotors to rotate.

The microphones 112-1 to 112-8 are sound receivers configured to convert a sound wave, that is, a variation in atmospheric pressure, into a voltage value as a sound signal. The microphones 112-1 to 112-8 output the converted sound signals to the signal processing unit 113.

The microphones 112-1 to 112-8 are arranged in a fixed distance from the center of the moving object 111. In the supports 111-1 to 111-4, every two microphones of the microphones 112-1 to 112-8 are disposed at opposing positions. Accordingly, the positions of the eight microphones 112-1 to 112-8 are dispersed in the moving object 111.

The signal processing unit 113 converts analog sound signals input from the microphones 112-1 to 112-8 into digital sound signals in an A/D (Analog-to-Digital) conversion manner. Accordingly, eight channels of digital sound signals are acquired.

The signal processing unit 113 up-converts the converted digital sound signals from signals of a baseband frequency to signals of a RF frequency and transmits the up-converted signals as RF waves to the sound signal receiving unit 12.

The sound signal receiving unit 12 down-converts the received RF waves from the signals of an RF frequency to the signals of the baseband frequency and reconstructs the eight channels of digital sound signals.

The reflectors 114-1 to 114-3 reflect the infrared rays emitted from the distance detection unit 14. The reflectors 114-1 to 114-3 are, for example, infrared prisms.

The reflector 114-1 is disposed between the support 111-1 and the support 111-2 and on the outer edge of the moving object 111. The reflector 114-2 is disposed between the support 111-1 and the support 111-4 and on the outer edge of the moving object 111. The reflector 114-3 is disposed between the support 111-3 and the support 111-4 and on the outer edge of the moving object 111. Accordingly, the infrared rays emitted from the distance detection unit 14 are incident on the reflectors 114-1 to 114-3 without interference from the supports 111-1 to 111-4.

Example of Coordinate Transform

An example of the coordinate transform performed by the coordinate transform unit 17 will be described below.

The following description is based on a two-dimensional coordinate system because it is simple, but the coordinate transform unit 17 in this embodiment may perform the coordinate transform based on a three-dimensional coordinate system.

Figure 5:
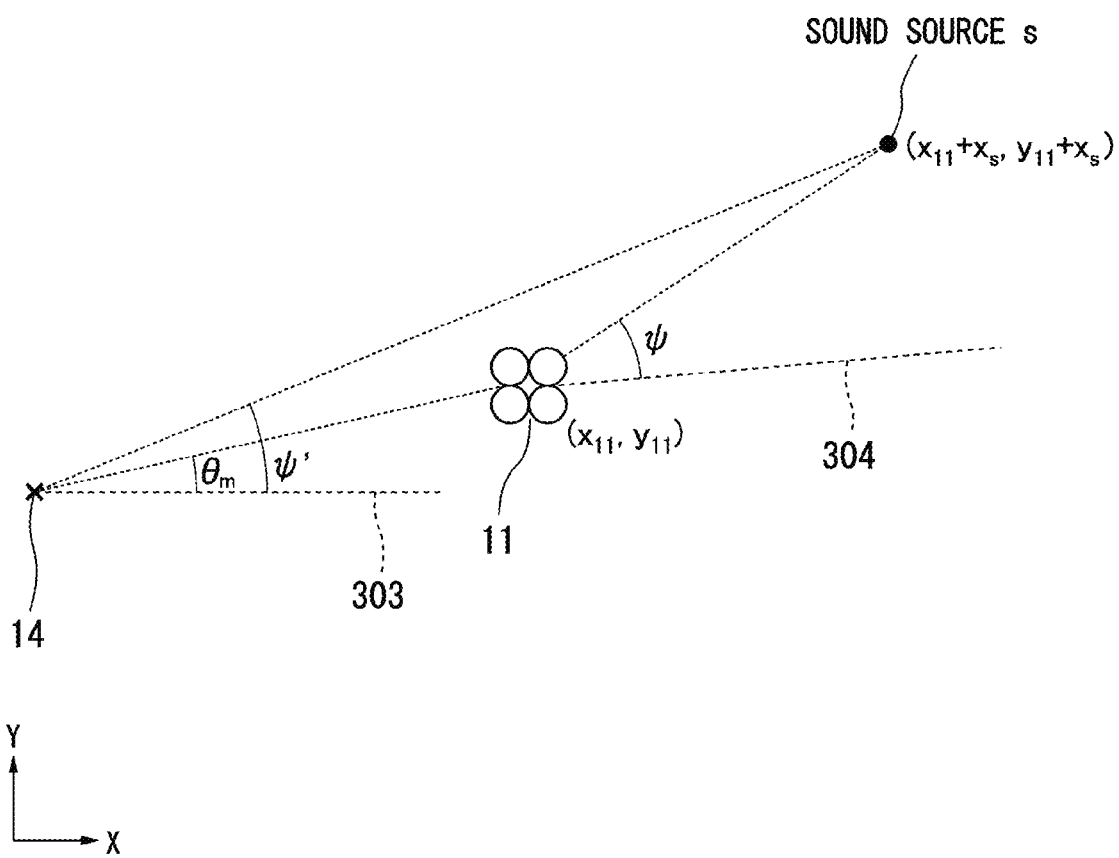
FIG. 5 is a conceptual diagram illustrating a positional relationship between a sound collection unit, a distance detection unit, and a sound source.

FIG. 5 is a conceptual diagram illustrating the positional relationship of the sound collection unit 11, the distance detection unit 14, and a sound source s.

In FIG. 5, the X direction represents the right direction of the page surface with respect to the distance detection unit 14 and the Y direction represents the direction perpendicular to the X direction and parallel to the horizontal plane.

The coordinate transform unit 17 transforms the direction $\phi$ of the sound source s with respect to the sound collection unit 11 into the direction $\phi'$ of the sound source s with respect to the distance detection unit 14 based on the direction $\theta_m$ of the sound collection unit 11 with respect to the distance detection unit 14.

In FIG. 5, segment 303 represents the direction (for example, $\theta_m=0$) serving as a reference in a coordinate system (world coordinate system) with respect to the distance detection unit 14. Segment 304 represents the direction (for example, $\phi=0$) serving as a reference in a coordinate system (sound coordinate system) with respect to the sound collection unit 11.

In addition to the sound direction information from the sound direction estimation unit 13, the sound source distance information indicating the distance to the sound source with respect to the sound collection unit 11 is input to the coordinate transform unit 17 from the sound direction estimation unit 13. Here, the sound direction estimation unit 13 calculates the distance to the sound source based on the arrangement information of microphones indicating the arrangement of the microphones in the sound collection unit 11 and the calculated sound direction. The sound direction estimation unit 13 outputs the sound source distance information indicating the calculated distance in addition to the sound direction information to the coordinate transform unit 17.

The coordinate transform unit 17 calculates the coordinates $(x_s, y_s)$ of the sound source s with respect to the sound collection unit 11 based on the input sound direction information and the input sound source distance information. Here, $x_s$ represents a coordinate value in the X direction and $y_s$ is a coordinate value in the Y direction. That is, the coordinate transform unit 17 transforms the sound direction indicated by the sound direction information and the sound source distance indicated by the sound source distance information, which are input from the sound direction estimation unit 13, to the coordinate system of the position estimation unit 16.

The coordinate transform unit 17 adds the coordinates $(x_{11}, y_{11})$ of the sound collection unit 11 indicated by the position information input from the position estimation unit 16 and the calculated coordinates $(x_s, y_s)$ of the sound source s and calculates the coordinates $(x_s+x_{11}, y_s+y_{11})$ of the sound s with respect to the distance detection unit 14. The coordinates $(x_{11}, y_{11})$ of the sound collection unit 11 are coordinates with respect to the position of the position estimation unit 16 and are coordinate values expressed in the coordinate system of the position estimation unit 16. The coordinate transform unit 17 transforms the calculated coordinates of the sound source s with respect to the distance detection unit 14 to polar coordinates and calculates an angle from the reference direction (segment 303) as the direction $\phi'$ of the sound source s with respect to the distance detection unit 14. The coordinate transform unit 17 outputs the calculated direction $\phi'$ to the sound direction output unit 18.

Sound Direction Estimating Process

A sound direction estimating process according to this embodiment will be described below.

Figure 6:
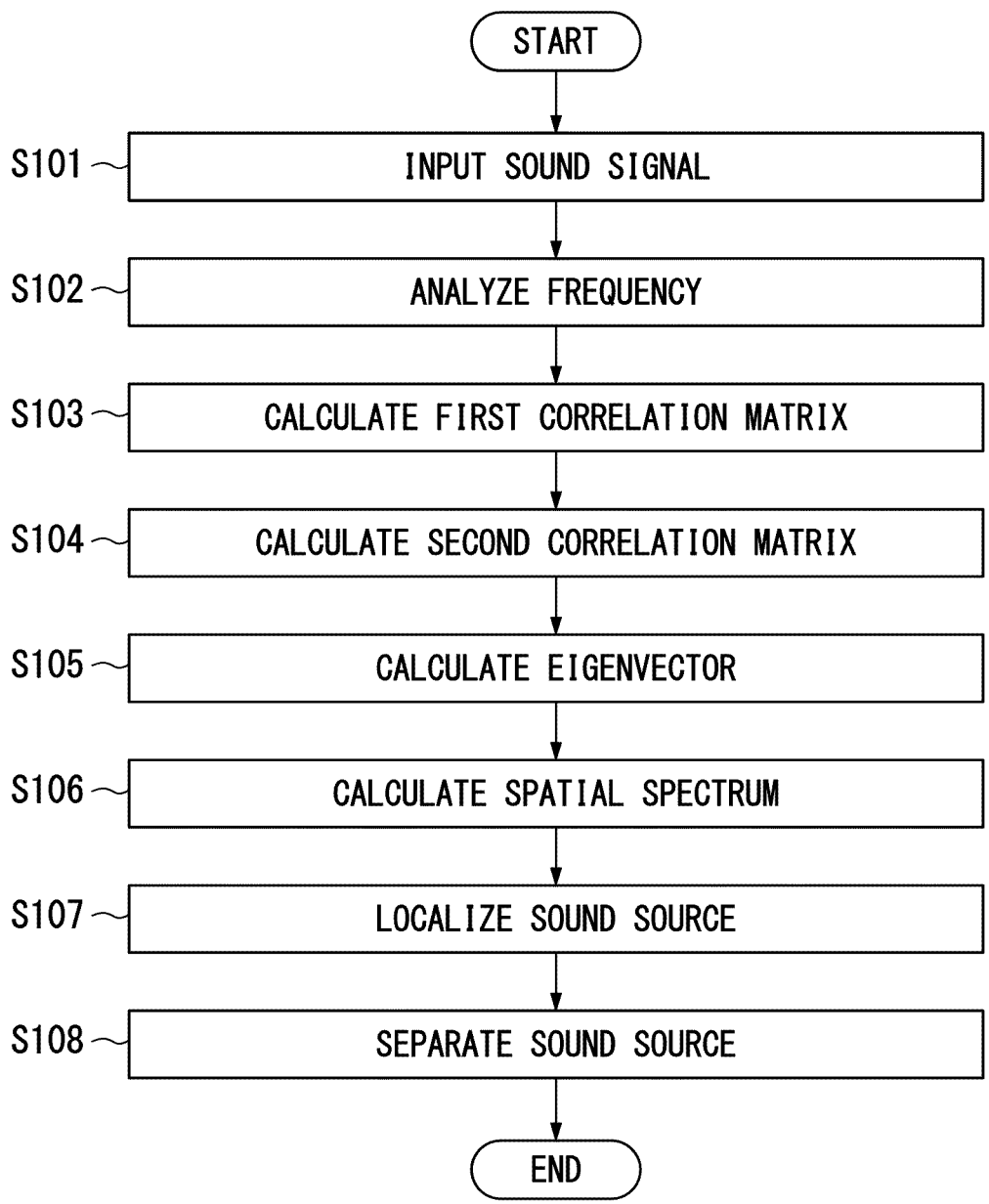
FIG. 6 is a flowchart illustrating a process flow of a sound direction estimating process according to the first embodiment.

FIG. 6 is a flowchart illustrating the process flow of the sound direction estimating process according to this embodiment.

(Step S101) M channels of sound signals are input to the frequency analyzing unit 131 from the sound signal receiving unit 12. Thereafter, the process flow goes to step S102.

(Step S102) The frequency analyzing unit 131 performs a discrete Fourier transform (frequency analysis) for each frame on the respective channels of sound signals and generates input signals in the frequency domain. The frequency analyzing unit 131 outputs the channels of input signals generated from each frame to the first correlation matrix calculation unit 132 and the second correlation matrix calculation unit 133. Thereafter, the process flow goes to step S103.

(Step S103) The first correlation matrix calculation unit 132 calculates a correlation matrix $R(\omega, f)$ (first correlation matrix) for each frequency $\omega$ and each frame time f, for example, using Expression (1) based on the input signals input from the frequency analyzing unit 131. The first correlation matrix calculation unit 132 outputs the calculated correlation matrix $R(\omega, f)$ to the eigenvector calculation unit 134. Thereafter, the process flow goes to step S104.

(Step S104) The second correlation matrix calculation unit 133 generates noise signals based on the input signals input from the frequency analyzing unit 131. The second correlation matrix calculation unit 133 calculates a noise correlation matrix $K(\omega, f)$ (second correlation matrix) for each frequency $\omega$ and each frame time f, for example, using Expression (2). The second correlation matrix calculation unit 133 outputs the calculated noise correlation matrix $K(\omega, f)$ to the eigenvector calculation unit 134. Thereafter, the process flow goes to step S105.

(Step S105) The eigenvector calculation unit 134 calculates M eigenvectors for each frequency $\omega$ and each frame time f using the correlation matrix $R(\omega, f)$ input from the first correlation matrix calculation unit 132 and the noise correlation matrix $K(\omega, f)$ input from the second correlation matrix calculation unit 133.

The eigenvector calculation unit 134 uses, for example, Expression (3) or (4) to calculate the M eigenvectors. Thereafter, the process flow goes to step S106.

(Step S106) The spatial spectrum calculation unit 135 calculates the spatial spectrum $P(\omega, \phi, f)$ based on the M eigenvectors $e_1, \ldots, e_M$ and the transfer function vector $G(\omega, \phi)$ read from the storage unit for each frequency $\omega$ and each sound direction $\phi$ at each frame f. The spatial spectrum calculation unit 135 uses, for example, Expression (5) to calculate the spatial spectrum $P(\omega, \phi, f)$. The spatial spectrum calculation unit 135 averages the calculated spatial spectrums $P(\omega, \phi, f)$ in a predetermined frequency band and calculates the average spatial spectrum $<P(\phi, f)>$, for example, using Expression (6) for each frame f and each sound direction $\phi$.

The spatial spectrum calculation unit 135 outputs the calculated average spatial spectrum $<P(\phi, f)>$ to the sound source localization unit 136. Thereafter, the process flow goes to step S107.

(Step S107) The sound source localization unit 136 selects (localizes a sound source) a sound direction $\phi$ in which the average spatial spectrum $<P(\phi, f)>$ input from the spatial spectrum calculation unit 135 is larger than a predetermined threshold value and the average spatial spectrum $<P(\phi, f)>$ has a local maximum value. The sound source localization unit 136 outputs the sound direction information indicating the sound directions $\phi$ of the selected sound sources to the coordinate transform unit 17 and the sound source separation unit 137. Thereafter, the process flow goes to step S108.

(Step S108) The sound source separation unit 137 separates the sound signals of the sound sources from the M channels of sound signals input from the sound signal receiving unit 12 based on the input sound direction information.

The sound source separation unit 137 outputs the generated sound signals to the outside. Thereafter, the process flow ends.

As described above, in this embodiment, the correlation matrix of multiple channels of input sound signals is calculated and the correlation matrix of noise signals based on the channels of sound signals is calculated. Then, in this embodiment, the directions of the sound sources associated with the channels of input sound signals are estimated using the spatial spectrums calculated based on the correlation matrix based on the input sound signals and the correlation matrix of the noise signals.

Accordingly, even when characteristics of noise signals are not known, it is possible to further accurately estimate a direction of a target sound.

Second Embodiment

A second embodiment of the present invention will be described below with reference to the accompanying drawings. The same elements and processes as in the first embodiment will be referenced by the same reference signs and the above description will be quoted.

A sound processing system 2 (not shown) according to this embodiment includes a sound direction estimation unit 23 instead of the sound direction estimation unit 13 in the sound processing system 1 (see FIG. 1).

Figure 7:
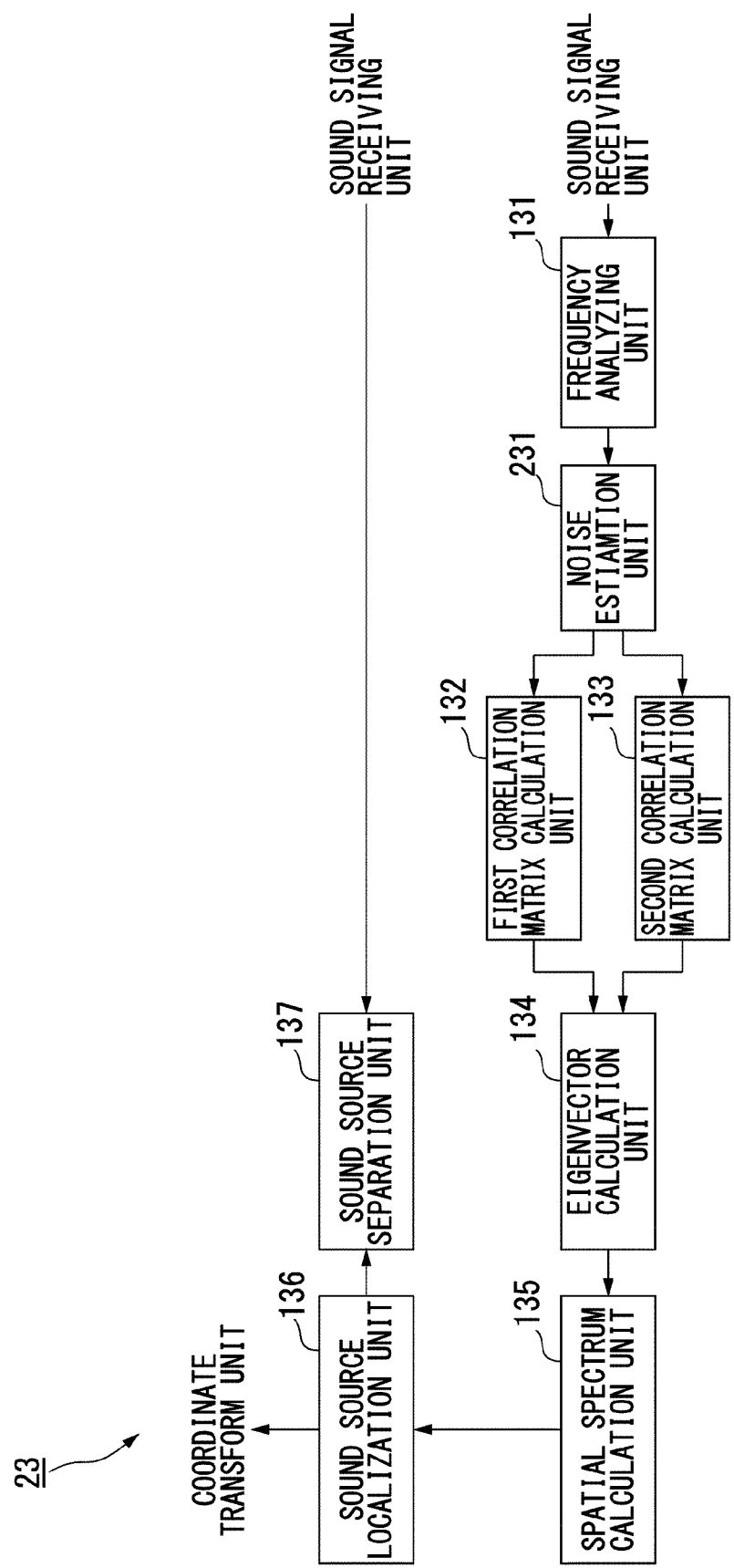
FIG. 7 is a diagram schematically illustrating a configuration of a sound direction estimation unit 23 according to a second embodiment of the present invention.

FIG. 7 is a diagram schematically illustrating the configuration of the sound direction estimation unit 23 according to this embodiment.

The sound direction estimation unit 23 further includes a noise estimation unit 231 in addition to the configuration of the sound direction estimation unit 13 (see FIG. 2).

The noise estimation unit 231 estimates a target sound signal including a predetermined type of target sound from input signals input from the frequency analyzing unit 131 and outputs the estimated target sound signal to the first correlation matrix calculation unit 132. The target sound includes a sound to be heard by a user, for example, a human voice or music. The noise estimation unit 231 estimates a noise signal indicating components other than the target sound component in the input signals, that is, the noise component, and outputs the estimated noise signal to the second correlation matrix calculation unit 133.

When the predetermined target sound is a human voice, the noise estimation unit 231 may perform any or both of (1) estimation of a target sound signal through voice activity detection and (2) estimation of stationary noise.

(1) Estimation of Target Sound Signal Through Voice Activity Detection

The noise estimation unit 231 performs the voice activity detection (VAD) on the input signals input from the frequency analyzing unit 131. Accordingly, it is determined whether the input signals mainly include a voice. The noise estimation unit 231 performs the voice activity detection in the time domain on the input signals for each sound section. The sound section means a section interposed between a rising (onset) of the amplitude of an input signal and a falling (decay) thereof. The rising is a section in which power of an input signal is larger than predetermined power after a silent section. The falling is a section in which the power of an input signal is smaller than a predetermined power before a silent section. The noise estimation unit 231 determines that the amplitude is rising, for example, when the power value of each frame is smaller than a predetermined threshold power value just before and larger than the threshold power value at the present time. On the contrary, the noise estimation unit 231 determines that the amplitude is falling when the power value is larger than the predetermined threshold power value just before and smaller than the threshold power value at the present time.

The noise estimation unit 231 determines that a section is a sound section when the number of zero crossings for each frame is larger than a predetermined number. The number of zero crossings is the number of times in which the amplitude value in the time domain of an input signal crosses zero, that is, the number of times in which the amplitude value changes from a negative value to a positive value or from a positive value to a negative value. The noise estimation unit 231 determines that the section is a non-speech section when the number of zero crossings is lower than a predetermined number.

The noise estimation unit 231 outputs the input signal of a speech section as a target sound signal to the first correlation matrix calculation unit 132 and outputs the input signal of a non-speech section to the second correlation matrix calculation unit 133. Therefore, the first correlation matrix calculation unit 132 calculates the correlation matrix R(ω, f) based on the input signal of the speech section input from the noise estimation unit 231. The second correlation matrix calculation unit 133 calculates the noise correlation matrix K(ω, f) based on the noise signal which is an input signal of a non-speech section input from the noise estimation unit 231. Therefore, when the window lengths $T_R$ and $T_N$ (see FIG. 3) are set to be larger than a period in which a speech section and a non-speech section are switched for each speech, for example, 0.3 seconds, at least one of the correlation matrix R(ω, f) and the noise correlation matrix K(ω, f) is not a zero matrix. Accordingly, since zero division or calculation of a zero vector in the eigenvector calculation unit 134 is avoided, the operation of the sound direction estimation unit 23 is stabilized.

(2) Estimation of Stationary Noise

The noise estimation unit 231 calculates the power of stationary noise, for example, using an HRLE (Histogram-based Recursive Level Estimation) method based on the input signals input from the frequency analyzing unit 131. In the HRLE method, the noise estimation unit 231 calculates a histogram (frequency distribution) of power in a log domain for each frequency, and calculates the power at which the cumulative frequency based on the cumulative distribution thereof corresponds to a predetermined threshold value (for example, 50%) as power of stationary noise. The noise estimation unit 231 is not limited to the HRLE method and may calculate the power of stationary power using another method, for example, a MCRA (Minima-Controlled Recursive Average) method.

Thereafter, the noise estimation unit 231 outputs the calculated power of stationary noise as a noise signal to the second correlation matrix calculation unit 133. The noise estimation unit 231 reduces the power of stationary noise from the power of the input signal and calculates a target sound signal. The noise estimation unit 231 outputs the calculated target sound signal to the first correlation matrix calculation unit 132. The first correlation matrix calculation unit 132 calculates a correlation matrix R(ω, f) based on the target sound signal input from the noise estimation unit 231. The second correlation matrix calculation unit 133 calculates a noise correlation matrix K(ω, f) based on the noise signal input from the noise estimation unit 231. Therefore, a component independent of the noise correlation matrix K(ω, f) is included in the correlation matrix R(ω, f) regardless of the window lengths $T_R$ and $T_N$ (see FIG. 3). The delay time $f_s$ (see FIG. 3) is allowed to be zero. Accordingly, it is possible to reduce a processing delay due to the window lengths $T_R$ and $T_N$ or the delay time $f_s$.

In this example, the eigenvector calculation unit 134, the spatial spectrum calculation unit 135, and the sound source localization unit 136 may perform calculation of M eigenvectors and selection of an average spatial spectrum <P(ϕ, f)> and a sound direction ϕ on a frame f belonging to the speech section.

Since the frame f belonging to a non-speech section is not included as a processing target, it is possible to estimate a sound direction ϕ which is significant as a target sound.

The example where a predetermined target sound is a human voice is described above, but this embodiment is not limited to this example. The noise estimation unit 231 may employ another method as long as it can perform a process of sequentially determining a target sound or noise or estimating such components.

Sound Direction Estimating Process

A sound direction estimating process according to this embodiment will be described below.

Figure 8:
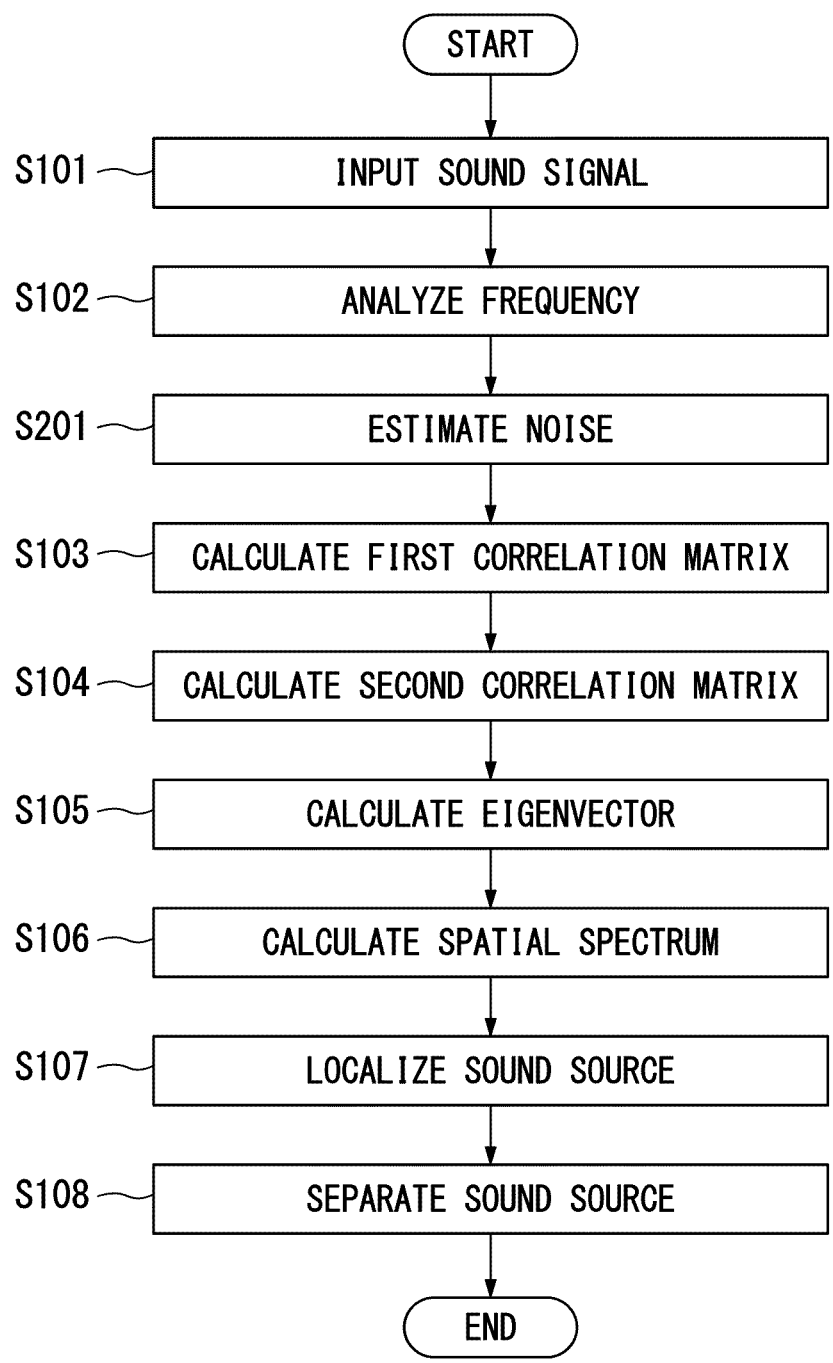
FIG. 8 is a flowchart illustrating a process flow of a sound direction estimating process according to the second embodiment.

FIG. 8 is a flowchart illustrating the process flow of the sound direction estimation unit according to this embodiment.

The sound direction estimating process according to this embodiment is a process in which the process of step S201 is added to the sound direction estimating process shown in FIG. 6. In the sound direction estimating process according to this embodiment, the process of step S201 is performed after the process of step S102 ends.

(Step S201) The noise estimation unit 231 estimates a noise signal mainly including a noise component out of an input signal based on the input signal input from the frequency analyzing unit 131. The noise estimation unit 231 outputs the estimated noise signal to the second correlation matrix calculation unit 133. The noise estimation unit 231 outputs a target sound signal mainly including a target sound component out of the input signal to the first correlation matrix calculation unit 132. Thereafter, the process flow goes to step S103.

As described above, in this embodiment, the noise estimation unit 231 estimates the noise signal mainly including a noise component based on the input signal. A component independent of the noise correlation matrix calculated by the second correlation matrix calculation unit 133 is included in the correlation matrix calculated by the first correlation matrix calculation unit 132. Accordingly, according to this embodiment, it is possible to reduce a processing delay by reducing the window length when the first correlation matrix calculation unit 132 calculates the correlation matrix and the window length or the delay time when the second correlation matrix calculation unit 133 calculates the noise correlation matrix.

OPERATIONAL EXAMPLE

An operational example of the sound processing system 1 (see FIG. 1) will be described below.

Figure 9:
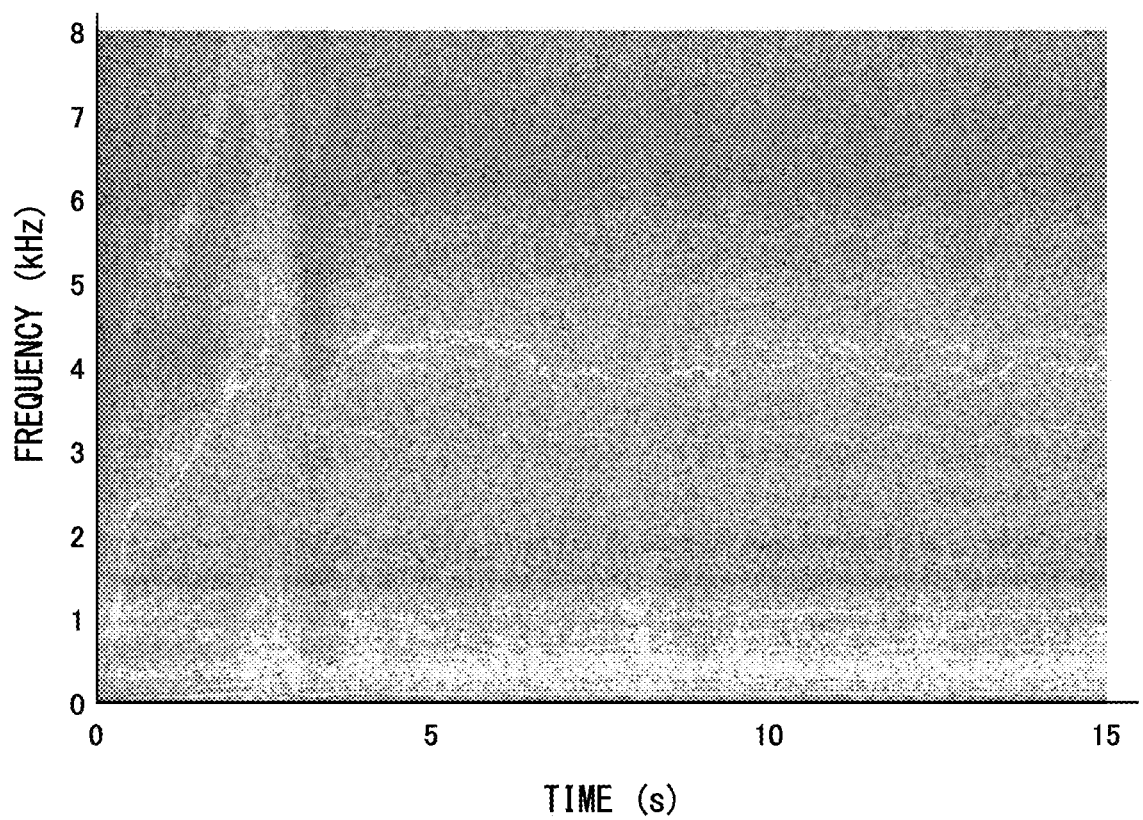
FIG. 9 is a diagram illustrating an example of a sound signal recorded by a microphone of a sound collection unit.

FIG. 9 is a diagram illustrating an example of a sound signal recorded by a microphone 112-1 of the sound collection unit 11.

In FIG. 9, the horizontal axis represents the time and the vertical axis represents the frequency. In FIG. 9, the gray scale represents the magnitude of the level of the sound signal. A brighter part represents a higher level of the sound signal, and a darker part represents a lower level of the sound signal.

With the movement of the moving object 111 (see FIG. 4) of the sound collection unit 11, the frequency characteristics of noise generated from the moving object 111 dynamically vary. During the first 3 seconds (time of 0 seconds to 3 seconds), the moving object 111 takes off and the rotational velocities of the rotors increase. The peak frequency of noise increases in correspondence therewith. For example, the peak frequency is about 1 kHz at 0 seconds, and the peak frequency is about 5 kHz at 3 seconds. Thereafter, when the sound collection unit 11 flies in the air, the frequency characteristics of noise are stabilized. For example, the peak frequency is about 4 kHz at 5 seconds.

Operational examples of the sound processing system 1 (this embodiment) according to the first embodiment and the related art (SEVD-MUSIC and GEVD-MUSIC) will be compared below.

The operation results of these three methods in following items (1) to (3) will be described: (1) an average spatial spectrum <P(ϕ, f)> for each sound direction; (2) a histogram of the average spatial spectrum $<P(\phi, f)>$; and (3) an index value based on the frequency in which a sound direction can be estimated.

In order to compare the operation results, two speakers were made to utter a speech as a sound source. The two speakers were positioned on a circumference separated from the sound collection unit 11 by 1.5 m.

The sound collection unit 11 was made to operate under the operating conditions of (A) fixed indoor (indoor and fixed), (B) flying indoor (indoor and flight), (C) fixed outdoor (outdoor and fixed). Here, "fixed" means that the sound collection unit is not changed in position while floating in the air (hovering). "Flying" means that the sound collection unit is changed in position while floating in the air (moving).

Hereinafter, the window lengths $T_R$ and $T_N$ and the delay time $f_s$ were set to 50 frames, 100 frames, and 25 frames, respectively, and 1 frame was set to 10 ms, as long as particularly mentioned differently.

Figure 10:
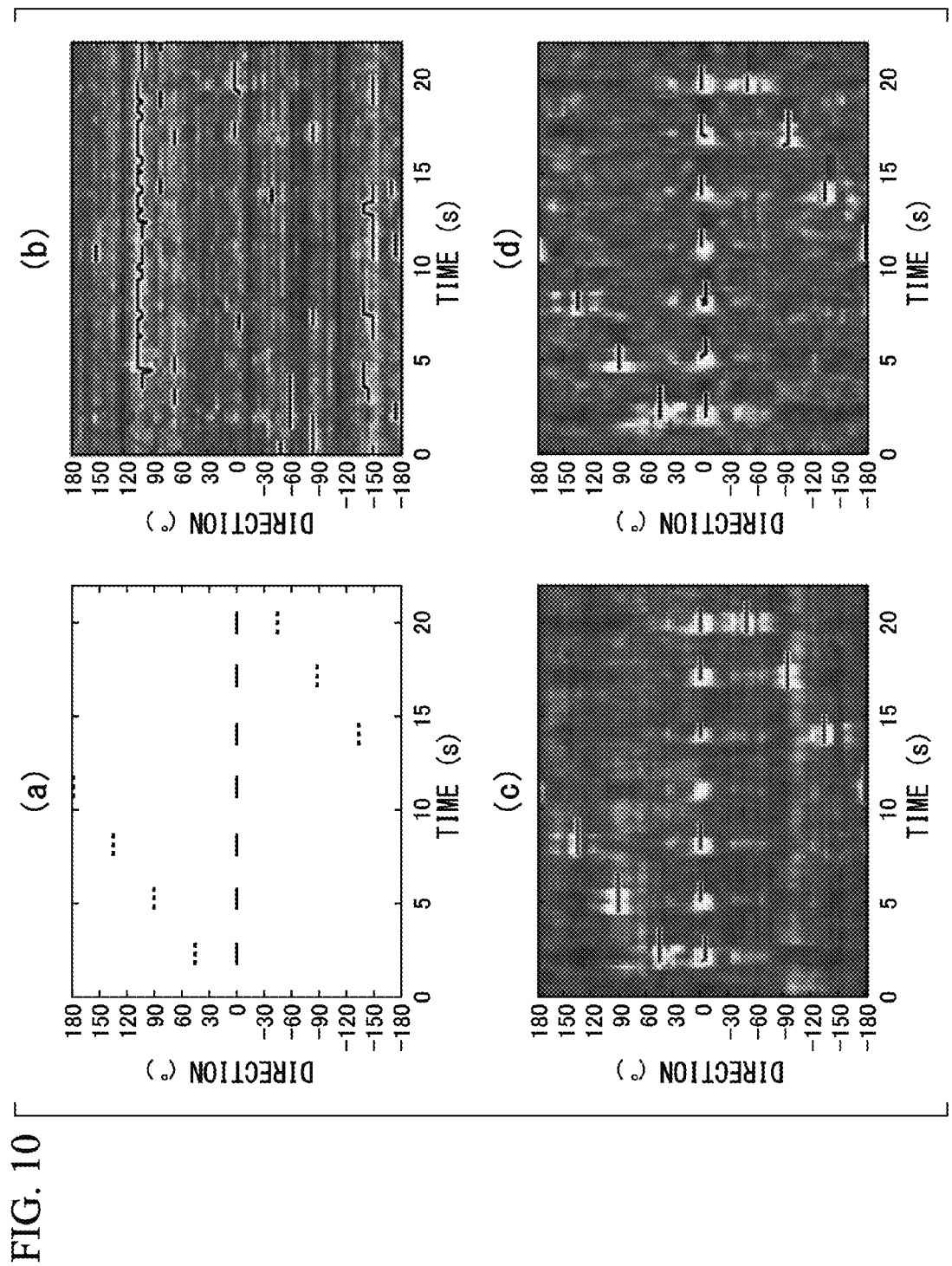
FIG. 10 is a diagram illustrating an example of an average spatial spectrum.
Figure 11:
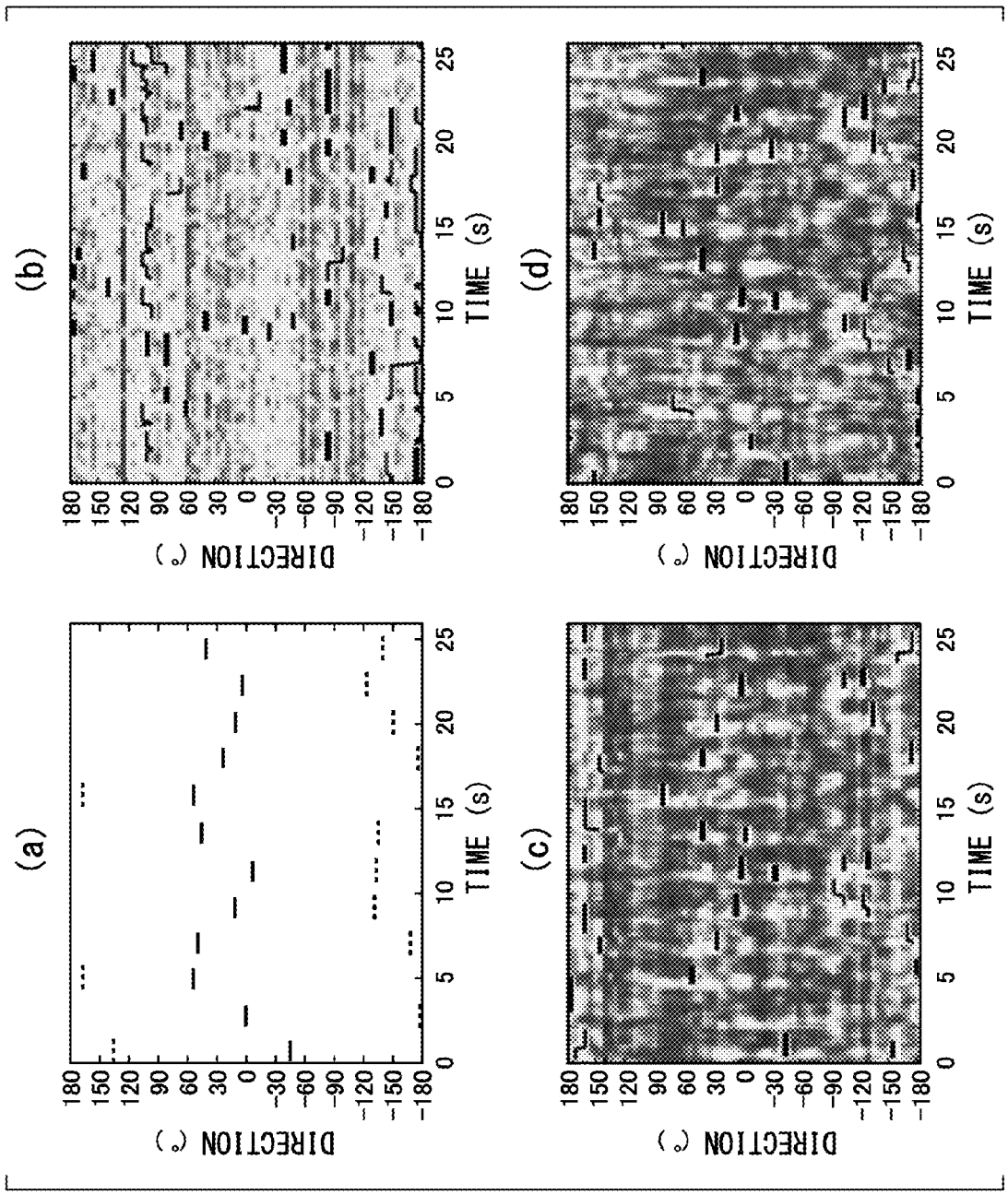
FIG. 11 is a diagram illustrating another example of the average spatial spectrum.
Figure 12:
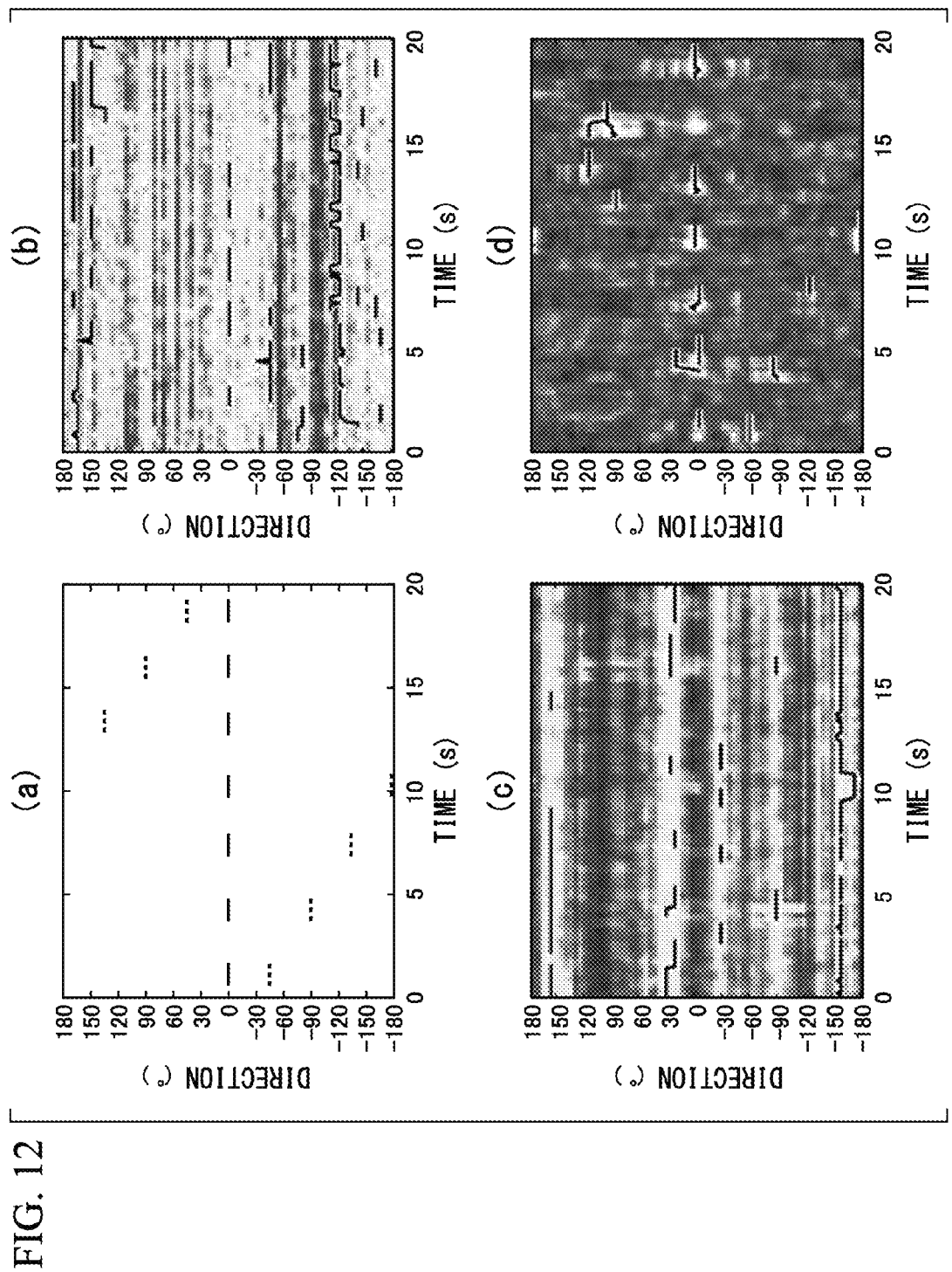
FIG. 12 is a diagram illustrating still another example of the average spatial spectrum.

An example of the average spatial spectrum $<P(\phi, f)>$ will be described below. FIGS. 10 to 12 are diagrams illustrating the average spatial spectrum $<P(\phi, f)>$ in the operating conditions (indoor and fixed, indoor and flight, and outdoor and fixed).

In Parts (a) to (d) of FIG. 10, Parts (a) to (d) of FIG. 11, and Parts (a) to (d) of FIG. 12, the horizontal axis represents the time and the vertical axis represents the sound direction. In Part (a) of FIG. 10, Part (a) of FIG. 11, and Part (a) of FIG. 12, solid lines and dotted lines distributed and extending in the time direction represent the actual sound direction, that is, the directions of the two speakers with respect to the sound collection unit 11.

In Parts (b) to (d) of FIG. 10, Parts (b) to (d) of FIG. 11, and Parts (b) to (d) of FIG. 12, segments distributed and extending in the time direction represents the estimated sound directions. In Parts (b) to (d) of FIG. 10, Parts (b) to (d) of FIG. 11, and Parts (b) to (d) of FIG. 12, the average spatial spectrums $<P(\phi, f)>$ calculated in the SEVD-MUSIC, the GEVD-MUSIC, and this embodiment are marked with gray scales. A brighter part represents a larger value and a darker part represents a smaller value.

FIG. 10 is a diagram illustrating an example (indoor and fixed) of an average spatial spectrum $<P(\phi, f)>$.

Part (a) of FIG. 10 shows an example where the direction of one speaker varies by 45° every three seconds and the direction of the other speaker does not vary at 0°. Comparing Part (a) of FIG. 10 with Part (c) or (d) thereof, the directions of the speakers and the estimated sound directions almost agree with each other. Accordingly, FIG. 10 shows that the directions of about two speakers can be estimated in this embodiment and the GEVD-MUSIC. On the other hand, comparing Part (a) of FIG. 10 with Part (b) thereof, the directions of the speakers and the estimated sound directions are different from each other. Accordingly, FIG. 10 shows that the directions of two speakers cannot be estimated in the SEVD-MUSIC.

FIG. 11 is a diagram illustrating another example (indoor and flight) of an average spatial spectrum $<P(\phi, f)>$.

Comparing Part (a) of FIG. 11 with Part (c) or (d) thereof, the directions of the speakers and the estimated sound directions are similar to each other, though not to the extent shown in FIG. 10. This means that the sound directions can be estimated in this embodiment or the GEVD-MUSIC, but the estimation accuracy of a sound direction is lowered because the frequency characteristics of noise dynamically vary. Part (c) of FIG. 11 shows that the estimation accuracy of a sound direction is lowered, in that the sound direction is more likely to be erroneously estimated in the vicinity of 160° in this embodiment and the GEVD-MUSIC that in Part (d) thereof. That is, it is possible to follow the dynamical variation of the frequency characteristics of noise in this embodiment than in the GEVD-MUSIC better. Comparing Part (a) and Part (b) of FIG. 11, the directions of the speakers are different from the estimated sound directions. That is, FIG. 11 shows that the sound direction cannot be estimated in the SEVD-MUSIC.

FIG. 12 is a diagram illustrating another example (outdoor and fixed) of an average spatial spectrum $<P(\phi, f)>$.

Part (a) of FIG. 12 shows an example where the direction of one speaker varies by 45° every three seconds and the direction of the other speaker does not vary at 0°. Here, the direction of one speaker varies oppositely to that in the example shown in Part (a) of FIG. 10.

Comparing Part (a) and Part (d) of FIG. 12, the directions of the speakers and the estimated sound directions are similar to each other, though not to the extent shown in FIGS. 10 and 11. This means that the sound directions can be estimated in this embodiment, but the estimation accuracy of a sound direction is lowered because the level of noise is higher than that in the case of indoor.

In the operating condition in FIG. 12, the level of noise is higher by 10 dB to 15 dB than the operating condition in FIG. 10. Comparing Part (a) of FIG. 12 with Part (b) or (c) thereof, the directions of the speakers are different from the estimated sound directions. That is, FIG. 12 shows that a sound direction cannot be estimated in the GEVD-MUSIC or the SEVD-MUSIC.

From these results, it can be seen that even when the frequency characteristics of noise is more remarkable or the level of noise is higher than in the related art, a sound direction can be estimated in this embodiment.

A histogram of a normalized spatial spectrum will be described below.

FIG. 13 is a diagram illustrating an example of a histogram of a normalized spatial spectrum.

The normalized spatial spectrum is a spectrum obtained by normalizing the average spatial spectrum $<P(\phi, f)>$. Parts (a) to (c) of FIG. 13 show the SEVD-MUSIC, the GEVD-MUSIC, and this embodiment, respectively. In Parts (a) to (c) of FIG. 13, the horizontal axis represents the normalized spatial spectrum and the vertical axis represents a normalized frequency. The normalized frequency means the occurrence (frequency) of each normalized spatial spectrum. The normalized spatial spectrum in the horizontal axis is normalized so that the maximum value is 1.0. The normalized frequency in the vertical axis is normalized so that the cumulative frequency of the normalized spatial spectrum from zero to the maximum value is 1.0.

The width of a normalized frequency distribution is an index indicating that noise detected as a sound source in directions other than the estimated direction can be suppressed. This index is an index indicating the estimation accuracy of a sound direction. It can be seen that as the distribution of the normalized frequency becomes narrower, noise can be more effectively suppressed and as the distribution of the normalized frequency becomes broader, noise cannot be more effectively suppressed.

FIG. 13 shows that the distribution of the normalized frequency becomes narrower in the order of Part (a), Part (b), and Part (c). This means that noise can be effectively suppressed in the order of this embodiment, the GEVD-MUSIC, and the SEVD-MUSIC, in other words, that the sound direction can be estimated with high accuracy.

FIG. 14 is a table illustrating a standard deviation of the normalized frequency.

FIG. 14 shows that the standard deviations of the normalized frequency in the estimation methods of the SEVD-MUSIC, the GEVD-MUSIC, and this embodiment are 0.14, 0.12, and 0.058, respectively. This means that noise can be effectively suppressed in the order of this embodiment, the GEVD-MUSIC, and the SEVD-MUSIC.

Index values based on the frequency at which a sound direction can be estimated will be described below.

A localization accuracy rate (LAR) and a localization correct rate (LCR) are used as the index values. The LAR and the LCR can be calculated using the following expression.

$$LAR=(N-S-D-I)/N$$

$$LCR=(N-S-D)/N$$

Here, N, S, D, and I represent the total number of speeches, the number of speeches of which the sound direction is erroneously estimated, the number of speeches which cannot be detected, and the number of speeches which are extra detected. The LAR has a maximum value of 1 but may have a negative value. This is because the number of speeches extra-detected is considered in the LAR.

On the contrary, the LCR has a maximum value of 1 and a minimum value of 0. This is because the LCR represents the ratio of the number of correct words to the total number of speeches. Here, the erroneous estimation of the sound direction means that the error between the estimated sound direction and the actual sound direction is larger than 5°.

FIG. 15 is a table illustrating an example of the localization accuracy rate and the localization correct rate.

In FIG. 15, the rows represent the operating conditions (indoor and fixed, indoor and flight, and outdoor and fixed) and the columns represent groups of the estimation method and the index values of the localization accuracy rate and the localization correct rate.

Regardless of the operating conditions, both the LAR and the LCR have a high value in the order of this embodiment, the GEVD-MUSIC, and the SEVD-MUSIC. Even when the operating condition is outdoor and fixed, the LAR is lowered to 14% but the LCR is lowered to 71% which is lowered by a smaller amount. That is, it can be seen in this embodiment that the high level of outdoor noise may cause extra detection of speeches but the possibility of erroneously estimating a sound direction in actual speeches is relatively low. That is, it can be seen that this embodiment is suitable for an application of estimating positions of sound sources without any exception as in searches in disasters.

An example of a difference value between the average spatial spectrums <P(ϕ, f)> (hereinafter, simply referred to as a "difference value") due to the window length and the delay time will be described below. The difference value is a difference value between the average value of the average spatial spectrums <P(ϕ, f)> in a section (speech area) in which two speakers speak in the operating conditions and the average value of the average spatial spectrums <P(ϕ, f)> in a section (non-speech area) in which no speech is uttered. That is, the difference value is an index value indicating a degree by which the speech area as a target sound and the non-speech area as noise can be distinguished from each other. The difference value is also an index value indicating the direction estimation accuracy.

Figure 16:
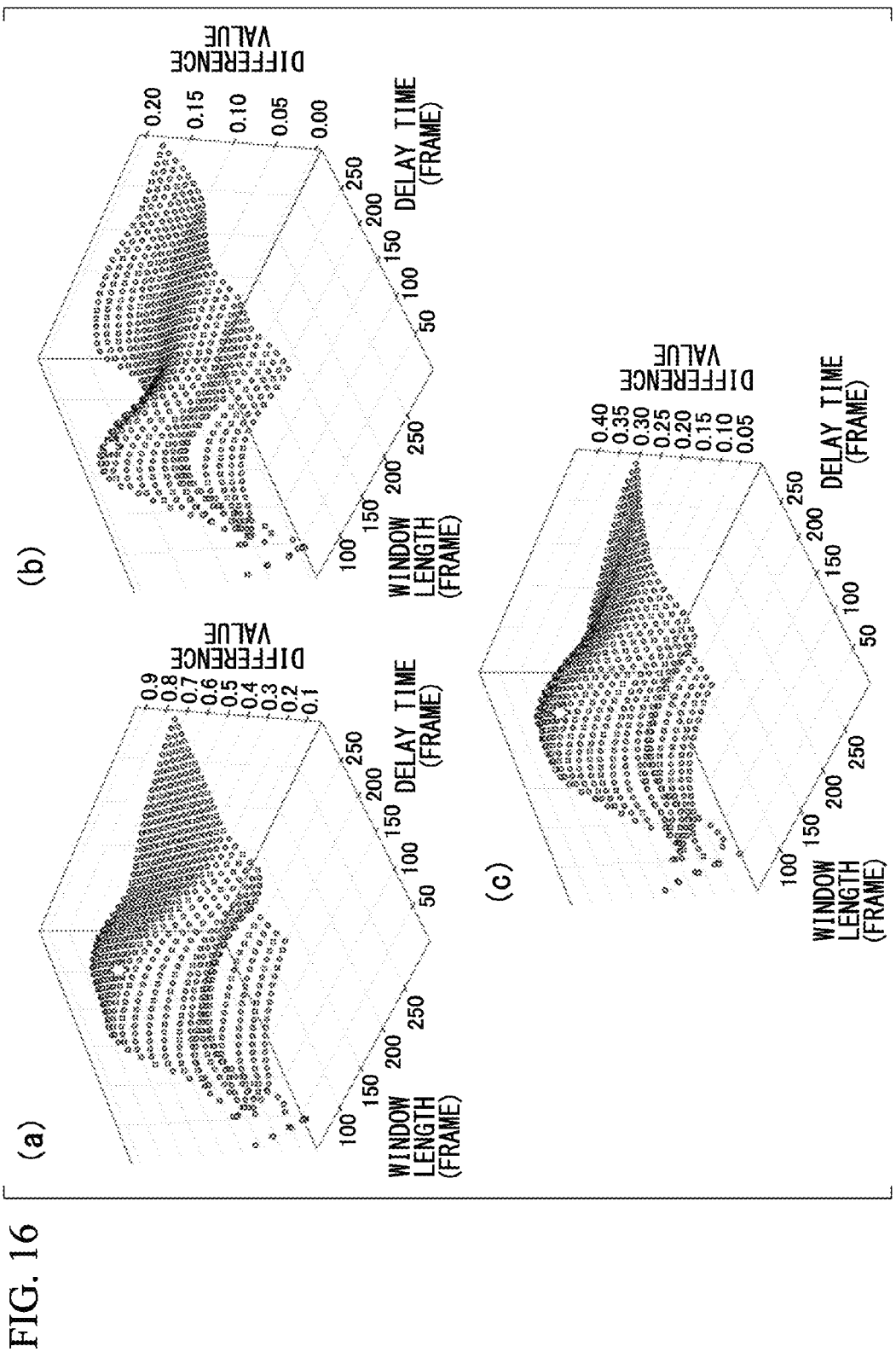
FIG. 16 is a diagram illustrating an example of a difference value.

FIG. 16 is a diagram illustrating an example of the difference value.

Parts (a) to (c) of FIG. 16 show the difference values when the operating conditions are indoor and fixed, indoor and flight, and outdoor and fixed, respectively. Parts (a) to (c) of FIG. 16 show three-dimensional plots in which two bottom sides represent the window length $T_N$ and the delay time $f_s$ and the vertical axis represents the difference value. In any operating condition, the window length $T_R$ is 50 frames. In Parts (a) to (c) of FIG. 16, * (star) is a point indicating the window length $T_N$ and the delay time $f_s$ in which the difference value is the maximum.

In FIG. 16, the maximum value of the difference value becomes larger in the order of indoor and fixed, outdoor and fixed, and indoor and flight, but the distribution of the difference values becomes slower in that order. That is, FIG. 16 shows that the direction estimation accuracy is better secured and the influence of the variations in the window length $T_N$ and the delay time $f_s$ become smaller in the order of indoor and fixed, outdoor and fixed, and indoor and flight. In the operating condition of indoor and flight, since the frequency characteristics of noise always vary, the window length $T_N$ or the delay time $f_s$ providing the maximum value of the difference value is smaller than those in the other operating conditions. In the example shown in FIG. 16, the group of the window length $T_N$ or the delay time $f_s$ providing the maximum value of the difference value include a group of $T_N$=130 frames and $f_s$=160 frames (indoor and fixed), a group of $T_N$=90 frames and $f_s$=140 frames (indoor and flight), and a group of $T_N$=130 frames and $f_s$=160 frames (outdoor and fixed). All the groups satisfy $T_N > T_R$ and $f_s > T_R$.

In the above-mentioned embodiments, the example where the spatial spectrum calculation unit 135 calculates the spatial spectrum based on the eigenvectors calculated using the GEVD method is described, but the embodiments are not limited to the eigenvectors as long as they are basis vectors acquired through matrix decomposition. For example, the spatial spectrum calculation unit 135 may calculate the spatial spectrum based on singular vectors calculated using generalized singular value decomposition (GSVD) instead of the eigenvectors. In this case, the sound direction estimation units 13 and 23 include a singular vector calculation unit (not shown) instead of the eigenvector calculation unit 134. The singular vector calculation unit performs the GSVD on the matrix $K(\omega, f)^{-1} R(\omega, f)$ to calculate M singular vectors $\epsilon_1, \ldots, \epsilon_m$, and outputs the calculated singular vectors $\epsilon_1, \ldots, \epsilon_m$ to the spatial spectrum calculation unit 135. The spatial spectrum calculation unit 135 calculates the spatial spectrum $P(\omega, \phi, f)$ using the singular vectors $\epsilon_1, \ldots, \epsilon_m$ input from the singular vector calculation unit instead of the eigenvectors $e_1, \ldots, e_M$ in Expression (5). In the GSVD, a right singular vector and a left singular vector are calculated for each singular value. Any of the right singular vector and the left singular vector may be used to calculate the spatial spectrum $P(\omega, \phi, f)$.

A part of the sound direction estimation unit (sound direction estimation device) 13 or 23 of the foregoing embodiment, for example, the frequency analyzing unit 131, the first correlation matrix calculation unit 132, the second correlation matrix calculation unit 133, the eigenvector calculation unit 134, the spatial spectrum calculation unit 135, the sound source localization unit 136, and the sound source separation unit 137 may be realized by a computer. In this case, a program for realizing a control function may be recorded in a computer-readable recording medium, a computer system may read the program recorded on the recording medium and executed to realize the control function. The term "computer system" used herein is a computer system embedded in the sound direction estimation unit 13 or 23, and includes an OS and hardware, such as peripherals. The term "computer-readable recording medium" refers to a portable medium, such as a flexible disk, a magneto-optical disk, a ROM, or a CD-ROM, or a storage device, such as a hard disk embedded in the computer system. The term "computer-readable recording medium" includes a medium which dynamically holds the program in a short time, such as a communication line when the program is transmitted through a network, such as Internet, or a communication line, such that a telephone line, or a medium which holds the program for a given time, such as a volatile memory inside a computer system serving as a server or a client. The program may realize a part of the above-described functions, or may realize all the above-described functions in combination with a program recorded in advance in the computer system.

A part or the entire part of the sound direction estimation unit 13 or 23 of the foregoing embodiment may be realized as an integrated circuit, such as large scale integration (LSI). Each functional block of the sound direction estimation unit 13 or 23 may be individually implemented as a processor, and a part or the entire part may be integrated and implemented as a processor. A method of integrating circuits is not limited to using an LSI, and may be realized by a dedicated circuit or a general-purpose processor. With advancement of a semiconductor technology, when a technology for an integrated circuit as a substitute for LSI appears, an integrated circuit by the technology may be used.

Although an embodiment of the invention has been described referring to the drawings, a specific configuration is not limited to those described above, and various changes in design and the like may be made within the scope without departing from the spirit of the invention.

What is claimed is:

1. A sound direction estimation device comprising:
   a first correlation matrix calculation unit configured to calculate a correlation matrix of a plurality of channels of input sound signals;
   a second correlation matrix calculation unit configured to calculate a correlation matrix of noise signals based on the plurality of channels of sound signals; and
   a sound source localization unit configured to calculate a spatial spectrum based on the correlation matrix calculated by the first correlation matrix calculation unit and the correlation matrix calculated by the second correlation matrix calculation unit and to estimate a direction of a sound source associated with the plurality of channels of sound signals using the calculated spatial spectrum,
   wherein the noise signals in the second correlation matrix calculation unit are signals obtained by delaying the plurality of channels of sound signals and a delay time is longer than a time of the plurality of channels of sound signals used to calculate the correlation matrix by the first correlation matrix calculation unit.

2. The sound direction estimation device according to claim 1, wherein a time of noise signals used to calculate the correlation matrix by the second correlation matrix calculation unit is longer than a time of the plurality of channels of sound signals used to calculate the correlation matrix by the first correlation matrix calculation unit.

3. The sound direction estimation device according to claim 1, further comprising a noise estimation unit configured to generate a target sound signal including a predetermined type of target sound and a noise signal indicating a noise component, which is a component different from the target sound, from the plurality of channels of input sound signals,
   wherein the first correlation matrix calculation unit is configured to calculate the correlation matrix using the target sound signal generated by the noise estimation unit as the plurality of channels of input sound signals, and
   wherein the second correlation matrix calculation unit is configured to calculate the correlation matrix using the noise signal generated by the noise estimation unit as the noise signals.

4. The sound direction estimation device according to claim 1, further comprising an eigenvector calculation unit configured to calculate an eigenvector by applying generalized eigenvalue decomposition to a matrix obtained by multiplying the correlation matrix calculated by the first correlation matrix calculation unit by an inverse matrix of the correlation matrix calculated by the second correlation matrix calculation unit,
   wherein the sound source localization unit calculates the spatial spectrum by dividing a norm of a transfer function vector for each direction of sound sources by a sum of inner products of a predetermined number of eigenvectors out of the eigenvectors calculated by the eigenvector calculation unit and the transfer function vectors.

5. The sound direction estimation device according to claim 1, wherein the sound source localization unit estimates a direction in which an average spatial spectrum which is an average of frequencies of the spatial spectrums has the local maximum value as the direction of the sound source associated with the plurality of channels of sound signals.

6. A sound processing system comprising:
   a sound collection unit configured to record a plurality of channels of sound signals;
   a position estimation unit configured to estimate a position of the sound collection unit; and
   a sound direction estimation unit configured to estimate a direction of a sound source associated with the plurality of channels of sound signals recorded by the sound collection unit,
   wherein the sound direction estimation unit includes
      a first correlation matrix calculation unit configured to calculate a correlation matrix of a plurality of channels of input sound signals,
      a second correlation matrix calculation unit configured to calculate a correlation matrix of noise signals based on the plurality of channels of sound signals, and
      a sound source localization unit configured to calculate a spatial spectrum based on the correlation matrix calculated by the first correlation matrix calculation unit and the correlation matrix calculated by the second correlation matrix calculation unit and to estimate a direction of a sound source associated with the plurality of channels of sound signals using the calculated spatial spectrum,
   wherein the noise signals in the second correlation matrix calculation unit are signals obtained by delaying the plurality of channels of sound signals and a delay time is longer than a time of the plurality of channels of sound signals used to calculate the correlation matrix by the first correlation matrix calculation unit.

7. A sound direction estimation method in a sound direction estimation device comprising:
   a first correlation matrix calculating step of calculating a correlation matrix of a plurality of channels of input sound signals;
   a second correlation matrix calculating step of calculating a correlation matrix of noise signals based on the plurality of channels of sound signals; and
   a sound source localizing step of calculating a spatial spectrum based on the correlation matrix calculated in the first correlation matrix calculating step and the correlation matrix calculated in the second correlation matrix calculating step and estimating a direction of a sound source associated with the plurality of channels of sound signals using the calculated spatial spectrum, wherein the noise signals in the second correlation matrix calculation step are signals obtained by delaying the plurality of channels of sound signals and a delay time is longer than a time of the plurality of channels of sound signals used to calculate the correlation matrix by the first correlation matrix calculation step.

8. A sound direction estimation program, embodied on a non-transitory computer readable medium, the sound direction estimation program causing a computer of a sound direction estimation device to perform:

a first correlation matrix calculating procedure of calculating a correlation matrix of a plurality of channels of input sound signals;

a second correlation matrix calculating procedure of calculating a correlation matrix of noise signals based on the plurality of channels of sound signals; and a sound source localizing procedure of calculating a spatial spectrum based on the correlation matrix calculated in the first correlation matrix calculating step and the correlation matrix calculated in the second correlation matrix calculating step and estimating a direction of a sound source associated with the plurality of channels of sound signals using the calculated spatial spectrum, wherein the noise signals in the second correlation matrix calculating procedure are signals obtained by delaying the plurality of channels of sound signals and a delay time is longer than a time of the plurality of channels of sound signals used to calculate the correlation matrix by the first correlation matrix calculating procedure.

* * * * *